United States Patent
Bundy et al.

(10) Patent No.: US 9,774,966 B1
(45) Date of Patent: Sep. 26, 2017

(54) MULTI-SPEAKER CONTROL FROM SINGLE SMART MASTER SPEAKER

(71) Applicant: Wahsega Labs LLC, Suwanee, GA (US)

(72) Inventors: Peter Bundy, Peachtree Corners, GA (US); Nathaniel Brown, Cumming, GA (US); Greg Coonley, Cumming, GA (US)

( * ) Notice: Subject to any disclaimer, the term of this patent is extended or adjusted under 35 U.S.C. 154(b) by 0 days.

(21) Appl. No.: 15/180,228

(22) Filed: Jun. 13, 2016

(51) Int. Cl.
*H04R 27/00* (2006.01)
*G06F 3/16* (2006.01)
*H04R 3/12* (2006.01)

(52) U.S. Cl.
CPC ............ *H04R 27/00* (2013.01); *G06F 3/162* (2013.01); *H04R 3/12* (2013.01); *H04R 2227/005* (2013.01)

(58) Field of Classification Search
CPC ........ G06F 9/546; G06F 1/266; G06F 1/1632; H04R 2420/07; H04R 5/02; H04R 1/00; H04R 1/2803; H04R 1/345; H04R 2420/01; H04R 29/001; H04R 3/12
See application file for complete search history.

(56) References Cited

U.S. PATENT DOCUMENTS

| | | | | |
|---|---|---|---|---|
| 7,483,538 B2* | 1/2009 | McCarty | .................. | H04R 5/02 381/77 |
| 8,837,529 B2* | 9/2014 | LaBosco | ................ | H04H 20/30 370/498 |
| 2003/0099212 A1* | 5/2003 | Anjum | .................. | H04W 92/02 370/328 |
| 2005/0131558 A1* | 6/2005 | Braithwaite | ... | H04N 21/234327 700/94 |
| 2008/0109095 A1* | 5/2008 | Braithwaite | ........ | H04L 12/2823 700/94 |
| 2012/0070004 A1* | 3/2012 | LaBosco | ................ | H04H 20/30 381/2 |

* cited by examiner

*Primary Examiner* — Mohammad Islam
(74) *Attorney, Agent, or Firm* — Smith Tempel Blaha LLC; Gregory Scott Smith

(57) ABSTRACT

An improved and cost effective speaker/controller system that is configured to allow a single master controller to have connectivity, communicability and control over multiple speaker/controllers in a cluster of speaker/controllers, through a communications connection with a single master speaker/controller in the cluster.

20 Claims, 16 Drawing Sheets

MULTI-SPEAKER CONTROL FROM SINGLE SMART MASTER SPEAKER

BACKGROUND

The Boy Scouts and the Girl Scouts share one thing in common, their motto "Be Prepared". In the world in which we live, this has become increasingly important. As parents ship their children off to school each day, few expect the day to turn into awful violent scenes that we have witnessed in recent years. But nonetheless, it happens. And so, our schools are constantly seeking ways to improve the safety of our young ones.

Yes, it is ever so important to "Be Prepared" but, on limited budgets, struggles to ensure teachers and staffs are adequately paid, necessary supplies are available for the classroom, etc., it can be exceedingly difficult to determine how to allocate funds. How much effort is necessary to be adequately prepared? It is clear that on hindsight, schools that have been victimized by egregious violence would most likely have wished they had spent more funds on being prepared.

Advances in technology generally bring improvements across many sectors of life. Safety in the classroom has also greatly benefited from such advancements. Panic buttons in the classroom, automatic locks and alerting systems all have improved from advancements in technology. But as most parents would attest, scrimping on safety is not something that is appreciated. And thus, there is a need in the art to provide enhancements in school safety and to do so in a budget efficient manner.

BRIEF SUMMARY

The present disclosure is directed to a system for extending functionality of a single room intercom/control system to another room. The system includes a master controller that connects to a master speaker system, such as with the INFORMACAST protocol as a non-limiting example. A control module is communicatively coupled to the master speaker system and controls the operation of a slave speaker system through a slave speaker system interface. The slave speaker system includes an interface to the slave speaker system interface, an analog speaker, a microphone, and one or more control interfaces. In operation, the master speaker system is coupled to the master controller through a PoE port. The control module operates to register the slave speaker system with the master controller. Once registered, the control module can obtain commands received at the master speaker system that are addressed to and intended for the slave speaker system. The control module then controls the operation of the slave speaker control system in accordance with the received commands through the slave speaker interface. In addition, actuations of components connected to the slave speaker system, such as panic buttons, SIP call initiating interfaces and sound reinforcement are received by the control module and then the slave speaker system is controlled accordingly.

DETAILED DESCRIPTION

The present invention, as well as features and aspects thereof, is directed towards providing an improved and cost effective speaker/controller system and, more specifically relates to a multiple speaker/control system that is configured to allow a single master controller to have connectivity, communicability and control over multiple speaker/controllers in a cluster of speaker/controllers, through a communications connection with a single master speaker/controller in the cluster.

Turning now to the figures, several embodiments of the speaker/control system, as well as features and aspects thereof are presented in further detail.

Figure 1:
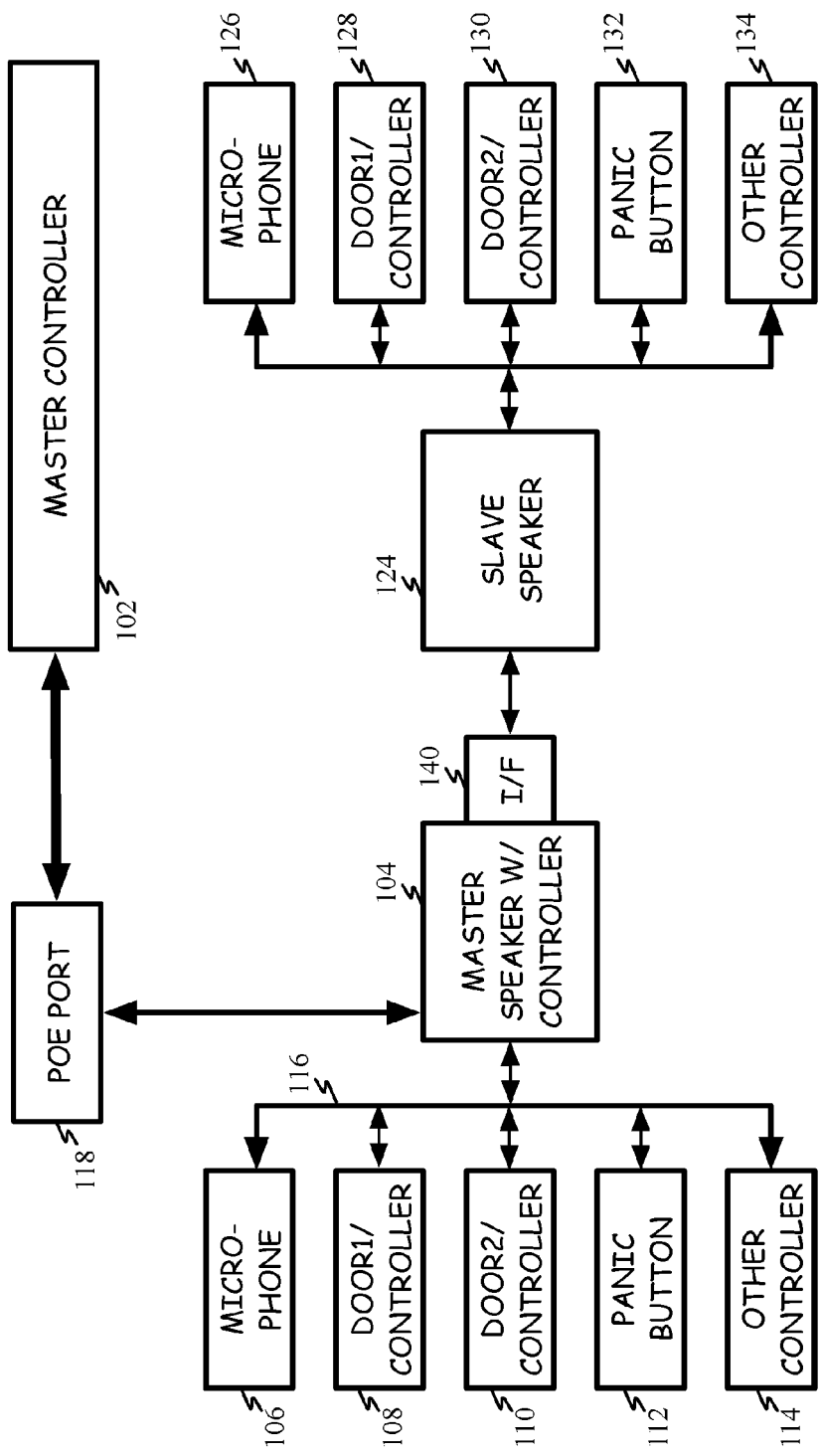
FIG. 1 is a block diagram illustrating an exemplary configuration for a speaker/control system (SCS).

FIG. 1 is a block diagram illustrating an exemplary configuration for a speaker/control system (SCS). In general, a master controller 102 serves as a central control center for the system. The master controller 102 can be used for sending signals and receiving signals from various components within a system, including but not limited to a master speaker with controller 104. The master speaker with controller 104 can be a commercially available speaker/controller system, like the one available from WAHSEGA LABS and VALCOM, or a proprietary speaker and controller system. The afore-described commercially available products include a communication and audio announcement system commercially referred to as INFORMACAST.

As those skilled in the art will understand, INFORMACAST is a voice over IP network protocol that is generally designed for providing live and recorded audio paging. The protocol allows endpoints (such as public addressed speakers) to autonomously announce their presence and capabilities (such as recording or the input and output definitions) and configure themselves to play audio broadcasts. The protocol is built largely on standard technologies including SLP for locating a configuration server, TFTP for obtaining configuration data, HTTP and XML for registering devices and transmitting commands, and multicast RTP for audio playback and recording.

SLP (which is an acronym for Service Location Protocol) is a service discovery protocol that allows computers and other devices to find services in a local area network without prior configuration. SLP has been designed to scale from small, unmanaged networks to large enterprise networks. Those skilled in the art will be familiar with SLP but further information regarding the protocol can be found in the standards documents RFC 2608 and RFC 3224.

SLP is used by devices to announce services on a local network. Each service must have a URL that is used to locate the service. Additionally it may have an unlimited number of name/value pairs, called attributes. Each device must always be in one or more scopes.

It should be appreciated that the master speaker with control may also be a proprietary product that operates on a proprietary system that is based on a technology other than INFORMACAST, however, the benefits of the present invention or most readily realized in the INFORMACAST environment utilizing the commercially available speaker/controllers.

The master speaker with controller (hereinafter master speaker) 104 is illustrated as interfacing with several classes and types of devices. In the illustrated embodiment, the master speaker 104 interfaces to a microphone 106, a controller for a first door 108, a controller for a second door 110, a panic button 112 and then an "other" controller 114. The "other" controller is listed because there are a wide variety of devices that can be controlled through various embodiments of the SCS. A few non-limiting examples may include the lights, an alarm and a clock. The master speaker 104 may be connected to each of the devices through a bus type structure 116 or by dedicated lines that run to each device, with each device being associated with a particular input/output of the master speaker 104.

The master speaker 104 is shown as interfacing to the master controller through a Power over Ethernet port or PoE port 118. A PoE port is any of several standardized or ad-hoc systems that pass electrical power along with data on Ethernet cabling. A PoE port allows a single cable to provide both data connection and electrical power to devices, such as the master speaker 104.

In operation, when the master speaker 104 is attached to the PoE port 118, the master speaker announces its presence and capabilities to be recognized by the master controller 102. Once connected and interfaced to the master controller 102, the master speaker 104 can be utilized by addressing particular request through INFORMACAST to accomplish various tasks. For instance, the master controller 102 can send audio or announcements to the master speaker 104, send a trigger to lock either one or both of the doors 108 110, or send other controlling commands to other controllers 114. In addition, the master speaker 104 can receive inputs from the various devices and forward the same to the master controller 102. For instance, audio can be detected at the microphone controller 106 from a microphone, which could be constant on, switch on or push to talk style microphone as an example.

The master speaker 104 is also illustrated as being communicatively coupled to a dumb or slave speaker 124. The master speaker 104 can be communicatively coupled to the slave speaker 124 in a variety of manners and using a variety of technologies. In one embodiment the master speaker 104 is communicatively coupled to the slave speaker 124 through a CAT 5/6 Ethernet cable. However, it will be appreciated that other wired, wireless and optical technologies may also be utilized, including but not limited to RF, BlueTooth, WiFi etc.

The slave speaker 124 is illustrated as interfacing to a similar set of controllers as the master speaker 104. Thus, the dumb speaker 124 is illustrated as interfacing to a microphone 126, a controller for a third door 128, a controller for a fourth door 13, a panic button 132 and an "other" controller 134.

The master speaker 104 interfaces to the slave speaker 124 through an interface controller 140. The interface controller 140 not only sends and receive audio and control signals to the slave speaker 124, but it also provides power to the slave speaker 124. Thus, the master speaker 104 is the only device that directly interfaces to the PoE 118 and, it passes the power from the PoE 118 to the slave speaker 124.

In operation, when the slave speaker 124 is connected to the master speaker 104 through the interface 140, the master speaker 104 performs the necessary protocol transmissions required by INFORMACAST to have the slave speaker 124 recognized as being present in the system and identifying its capabilities. Once the master controller 102 recognizes the slave speaker 124, the slave speaker 124 can be utilized by addressing particular request through INFORMACAST to accomplish various tasks.

The slave speaker 124 is controlled by the master speaker 104 capturing INFORMACAST communications directed to the slave speaker 124 and then repackaging or relaying the communications to the slave speaker 124 through interface controller 140. Further, any communications resulting from activity from the slave speaker 124 and/or the devices connected to the slave speaker 124 are sent to the master speaker 104 through the interface controller 140. These communications are then packaged or relayed to the master controller 102. Thus, the communications between the master speaker 104 and slave speaker 124 may conform to INFORMACAST protocol or be a proprietary protocol that is converted to INFORMACAST protocol by the master speaker 104 and or the interface controller 140.

Deployment Configurations.

Embodiments of the SCS can be deployed, installed or configured in different operating modes. As a non-limiting example that is not intended to limit the scope of various embodiments, three general operational configurations are described:

(1) Single room single speaker
(2) Single room, multiple speakers playing the same audio
(3) Multiple rooms/zones with each room/zone having a speaker While the hardware and software utilized for each such deployment can be the same, it will be appreciated that alternatively, some significant cost savings can be realized by eliminating certain elements from a deployed speaker. For instance, use of a commercially available master speaker includes a device that comprises the analog speaker, a hardware element and software that runs on the hardware element. It will be appreciated the combination of the hardware element and software could actually be accomplished completely in hardware, hardware and firmware, hardware and downloadable software, etc. Thus, the present embodiments are not limited to any particular configuration.

In some embodiments, the slave speaker also includes an analog speaker and a smaller, more simple hardware/software controller (slave controller). For instance, the smaller controller may be configured to only drive the speaker, microphone and a wall panel. The slave controller can be connected to the master speaker with a single RJ45 connector using Cat5 cable as a non-limiting example. Such a configuration would provide power to the slave speaker 124, line-level audio and a UART such that the master speaker 104 can control the slave speaker 124. All of the application logic and audio can thus be processed by the master speaker 104 thus allowing the slave controller to be a much simpler and less expensive device that is only required to amplify audio and operate the input/output controls based on commands exchanged with the master speaker 104.

(1) Single Room with Single Speaker
(a) Single Room Single Analog Speaker

Figure 2:
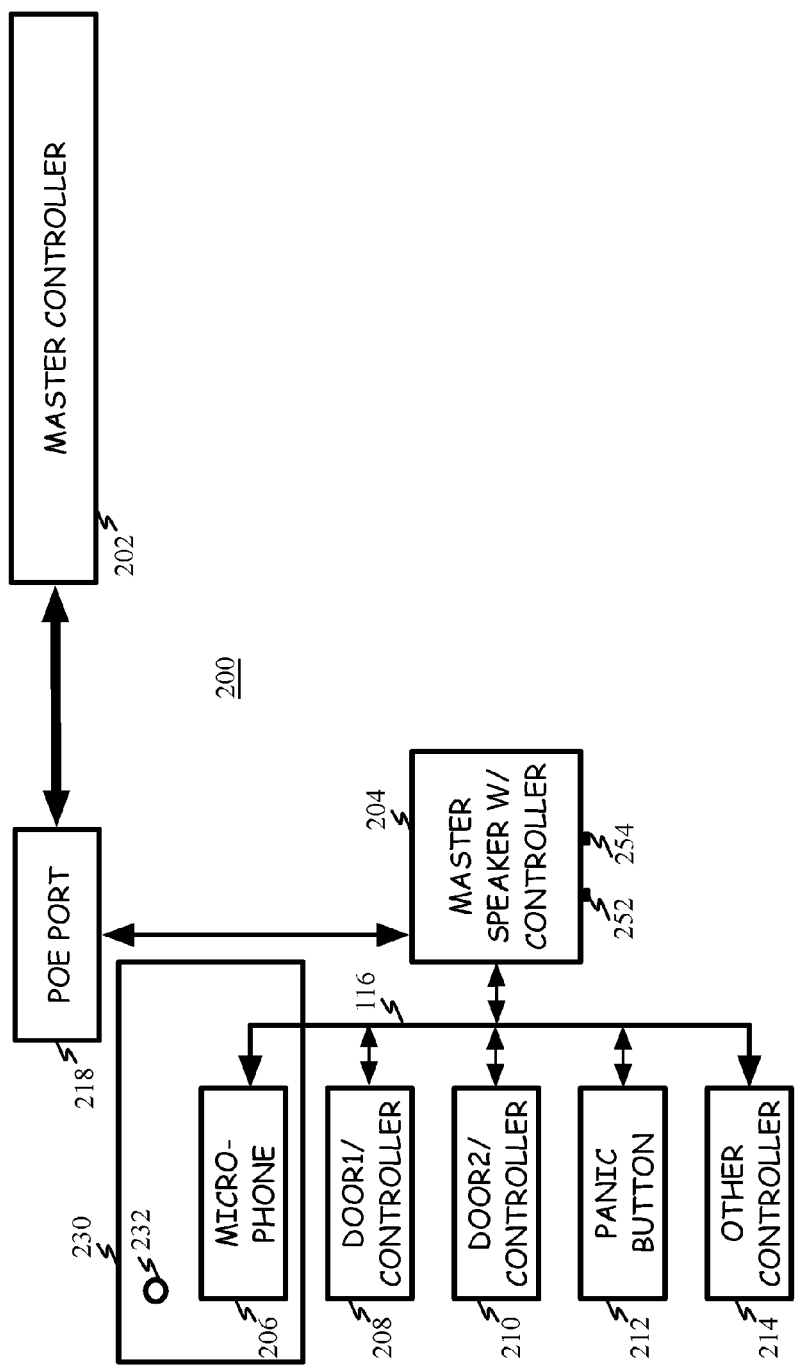
FIG. 2 is a block diagram illustrating the single room deployment of embodiments of the SCS.

FIG. 2 is a block diagram illustrating the single room deployment of embodiments of the SCS. It should be appreciated that while the several embodiments, as well as features and aspects thereof, are presented herein as being deployed in a classroom setting, the various embodiments can be deployed in a variety of settings including offices, factories, lecture halls, churches, airports, hotels, etc. The single room deployment includes a master speaker as previously described 204. The embodiments will again be described with reference to an INFORMACAST based system but, those skilled in the art will appreciate that other protocols and operating systems may likewise be utilized in various embodiments of the SCS. Thus, once the master speaker 204 is connected to the system and/or turned on, the master speaker 204 operates to follow INFORMACAST specifications to discover its configuration. Once the configuration is identified, the master speaker registers itself with the master server 202 as a speaker. The master speaker 204 is then able to receive commands from the master server 204. In the initialized and deployed state, the master speaker receives power, data, audio signals and control commands through the PoE port 118 from the master controller 202, and transmits the data, audio signals, responses and status to the master controller 202. It should also be understood that although the various figures only show one master speaker as interfacing to the master controller, there can actually be any number of master speakers that are each individually addressable by the master controller using the INFORMACAST protocols.

The master speaker 204 may receive a command to start and stop audio broadcasts. Thus, the master controller can send out a broadcast signal and selectively enable or disable the various master controllers from delivering the audio broadcast to the analog speaker of the master speaker 204. In addition, in the single room configuration, the master speaker 204 delivers the broadcast signal to the slave speaker 224 through the control interface 240. In some embodiments, the master speaker 204 may only deliver the broadcast signal to the slave speaker 224 in response to receiving a command to turn the audio on and then, stop the delivery of the broadcast signal upon reception of an audio off command. In other embodiments, the master speaker 204 may automatically pass the broadcast signal to the slave speaker 224 and then send a separate command to the slave controller to turn the audio on or off. For example, when the master speaker receives a command to turn the audio on, the master speaker 204 can in turn send an audio on command to the slave speaker 224. Thus, the broadcast signal is then audibly available on both the master speaker 204 and the slave speaker 224 simultaneously.

(b) SIP Endpoint

The Session Initiation Protocol (SIP) is a very flexible protocol that has great depth. It was designed to be a general-purpose way to set up real-time multimedia sessions between groups of participants. For example, in addition to simple telephone calls or VOIP calls, SIP can also be used to set up video and audio multicast meetings, or instant messaging conferences. The master speaker 204 is configured at startup of the system to operate as a SIP endpoint. The setup can be accomplished by switch settings, software settings, etc. At startup, the software operating in conjunction with the master speaker 204 reads configuration stored in its nonvolatile memory and prepares itself as a SIP endpoint (either by registering with its configured SIP server, or by preparing itself as a peer-to-peer SIP endpoint without registration). The master speaker may set up one or more SIP accounts per channel.

SIP and RTP (Real-Time Transport Protocol) calls can be established in full-duplex or half-duplex mode depending upon the configuration of the speaker and microphone. In half-duplex mode, the master speaker 204 monitors the audio from the peer using VAD (voice/audio detection). When the peer has sufficient audio, it plays that audio on the speaker and mutes the microphone. When the peer no longer has sufficient audio, it unmutes the microphone so that local audio can be heard, and mutes the speaker.

(c) Multiple Calls

The master speaker 204 can be configured to allow multiple simultaneous calls. This capability may apply to INFORMACAST audio broadcasts which are played simultaneously as well as SIP calls, which are conferenced together. As a non-limiting example, in INFORMACAST audio broadcasts, it may be desirable to play multiple audio broadcasts simultaneously. For instance, in such a configuration the audio for the school bell can be heard during announcements. Similarly, for SIP it may be desirable to conference calls together, which provides a better experience than rejecting calls when one is already in progress. In such a configuration, a party can then choose to hang up if they don't wish to be in a conference call.

In some embodiments, the operation of the master speaker 204 may have limited CPU capacity. It will be appreciated that varying levels of CPU power can be incorporated into the master speaker 204 but, for cost effectiveness and providing sufficient CPU power the majority of situations, some embodiments may include the capability to limit functionality based on CPU availability. As a non-limiting example, INFORMACAST broadcasts using high-quality audio (such as 44.1 kHz audio) can consume a considerable amount of the CPU capacity, such as 35% of the CPU capacity as an example. The master speaker 204 can track its CPU usage, and only accept additional calls if its rough estimate of its available CPU indicates that it has sufficient CPU capacity to handle the additional call. Thus, if the master speaker has a CPU processing load that is at or exceeds a specific threshold, further requests that would require additional CPU processing can be denied or queued for later processing. In other situations, a current task may be parked, put on hold or canceled to create CPU processing bandwidth to service a new request.

If additional INFORMACAST broadcasts are started and master speaker 204 cannot accept any more broadcasts (e.g. because it doesn't have enough CPU capacity remaining, or because the INFORMACAST account was configured with a low number of allowed simultaneous broadcasts), the new broadcasts are "parked" (put on hold) and are not played. When one of the active broadcasts ends, if there are any parked broadcasts, they can be unparked (taken off hold) in the order they were received until all parked broadcasts are playing or there aren't enough CPU capacity to unpark the remaining parked broadcasts.

(d) Dual Registration

Some embodiments of the master speaker 204 can be "dual registered" as both an INFORMACAST speaker and a SIP endpoint. In such embodiments, the master speaker 204 maintains active registrations/accounts with both services simultaneously. When supporting dual registration, the master speaker 204 can receive an incoming call from either the INFORMACAST audio broadcast or the SIP call services.

It is expected that situations would arise in which an INFORMACAST audio broadcast and a SIP call might occur simultaneously. Including the ability to handle this situation may significantly increase the cost of the SCS. Thus, in some embodiments, this scenario is handled by only allowing one type of simultaneous call. Thus, if an INFOR- MACAST broadcast audio session is active at the time of receiving a SIP call request, the SIP call request can be filtered or ignored. Likewise, if a SIP call is active at the time of receiving an INFORMACAST broadcast audio request, the INFORMACAST broadcast audio request can be filtered or ignored. In a situation in which an INFORMACAST broadcast audio request and a SIP call request are received at the same time (realizing that the two requests would actually be received serially but the concept of "being received at the same time" refers to having received both request prior to setting up a session for either of the requests) the various embodiments may be configured to respond differently, either by hard coding or software configuration. For instance, the SCS can be configured to give preference to the request that arrives first or, the system can be configured to give preference to one over the other. Further, in some embodiments, a user may even have the opportunity to select which request to accept.

It should also be appreciated that some embodiments may be configured to handle both types of calls simultaneously. For instance, some embodiments of the SCS may simply conference the audio of these two call types together. Several complexities can arise in this situation and the various embodiments may be configured to handle these complexities in different manners. For instance, without further processing, simply mixing the SIP and INFORMACAST broadcast together, the local and remote parties on the SIP call would have to speak loudly to be heard over the INFORMACAST broadcast. Alternately, the INFORMACAST broadcast could be played locally but not audible to the remote party, in which case the remote party would continue talking unaware that their speech may not even be intelligible over top of the INFORMACAST audio broadcast. Further, if the SCS is operating in half-duplex, the local party would be unable to speak to the remote party because the INFORMACAST audio would prevent the master speaker 204 from unmuting the microphone.

It should be appreciated that each of these complexities could be overcome by providing additional processing of the signals. For instance, in some embodiments, priority can be given to an INFORMACAST broadcast. Thus, if an INFORMACAST broadcast is received during a SIP call, the SIP call can be muted during the INFORMACAST broadcast. Likewise, if a SIP call is received during an INFORMACAST broadcast, priority can be given to the SIP call by muting the INFORMACAST broadcast. In the later example, the SCS may buffer the INFORMACAST broadcast and then continue the delivery upon the termination of the SIP call. In some embodiments, a user may be able to manually select which call to give priority to on a case-by-case basis. In addition, they CSC system can simply operate in accordance with the user activity. For instance, if an INFORMACAST broadcast is currently active when a user attempts to make a SIP call, the CSC can give preference to the SIP call under the assumption that the user would not be attempting to place the SIP call during the INFORMACAST broadcast if it was not important enough to do so. Further, the CSC system may simply prevent INFORMACAST broadcast to interrupt a SIP call of one party in a scenario in which other parties that are not in a SIP call will receive the broadcast and can inform the other party.

Further, the types of calls can be categorized with priority levels. While the current deployment of INFORMACAST may not support such granularity, it is anticipated that future versions may, as well as other existing or developed protocols. As a non-limiting example, a SIP call with a teacher having an innocuous conversation with the front office could be canceled if INFORMACAST needs to play an urgent tornado warning. Conversely, an INFORMACAST broadcast of the lunch menu cold be interrupted if a teacher needs to make a SIP call to report a student having a medical emergency.

Thus, a high priority SIP call may trump an active INFORMACAST broadcast while a low priority SIP call may be rejected. Likewise, a high priority INFORMACAST broadcast may trump an active SIP call (for instance for an emergency alert) while a lower priority INFORMACST broadcast may be ignored during an active SIP call. Those skilled in the art will recognize that other processing can also be employed for such scenarios.

(e) Multicast Audio

As previously mentioned, embodiments that are deployed within an INFORMACAST or similar protocol environment are only exemplary embodiments. Some embodiments may operate in a simple multicast audio environment that does not include signaling.

Such embodiments are particularly suitable for environments such as a warehouse, factory, hotel, etc. The smart speaker 204 can be configured to receive (or listen) to multiple broadcasts and filter them in accordance with priorities. As a non-limiting example, the smart speaker 204, or the master controller 202 can be configured to listen to up to 6 multicast audio streams that are prioritized from high to low. SIP calls may be assigned a medium priority, so that in this example, there is a total of 7 priority levels:

Multicast stream, highest priority (e.g. emergency paging)
Multicast stream, second highest priority
Multicast stream, third highest priority
SIP calls
Multicast stream, third lowest priority
Multicast stream, second lowest priority
Multicast stream, lowest priority (e.g. background music)

In operation, the exemplary embodiment, when multicast streams are enabled and configured, the device plays the highest priority audio source that's in use. This allows for a variety of uses such as background music (idle audio), simple paging and announcements, and emergency paging/broadcasts. Higher priority audio sources interrupt lower-priority ones temporarily. After the higher-priority audio source becomes idle again (i.e., multicast stream has been silent for a configurable period of time such as a few seconds, tens of seconds or even sub-second, or SIP calls have been hung up), the next-highest priority audio source is resumed.

(f) Panic Button

Various embodiments of the master speaker 204 may interface to a panic button. In operation, when the panic button 212 is actuated, the master speaker 204 receives a signal or, detects the closing of a current loop or a control line being grounded or raised to a particular voltage level, etc. In response, the master speaker 204 can then initiate an action in response to the actuation. The actions may include any of a variety of actions such as sounding an alarm in the particular room or vicinity of the panic button, sounding an alarm through out the system, sending a message to the master controller 202 to take action, such as sounding an alarm, playing an announcement, placing a SIP call to the classroom to obtain further details, opening an INFORMACAST connection to request further information, placing a call to authorities, etc. Similarly, the master speaker 204 may initiate a SIP call or INFORMACAST conference to a party at the master controller 201 or to authorities. It should also be appreciated that the panic button may be more than just a simple Boolean type actuation (i.e., actuated or not actuated). The master speaker 204 may be configured to detect multiple type of actuations such as three short actuation, followed by three long actuation, followed by three more short actuations (Morse code for SOS) as well as other sequences. Further, the panic button may be a smart panel that includes multiple buttons and sends a particular signal for each button or combination of buttons.

In one exemplary embodiment, when the panic button is actuated for a short period of time, the master speaker 204 may initiate an emergency SIP call to a first URI, such as the controller for the master controller 202. When the panic button is actuated for a prolonged period of time, the master speaker 204 initiates a SIP call to a different configurable URI, which may be someone prepared to handle an emergency.

In the exemplary embodiment, both types of calls may be considered "emergency" calls. When an emergency call is placed, any lower-priority calls or broadcasts on the master speaker 204 can be parked so that the emergency call becomes the only active call. When the emergency call is hung up, any parked calls or broadcasts get unparked.

Short-press emergency calls are higher-priority than all other calls, but lower priority than long-press emergency calls. This means a short-press call interrupts normal (non-emergency) calls, but not short-press or long-press emergency calls. Long-press emergency calls are the highest priority call in the system. This means a long-press emergency call interrupts all other types of calls, including short-press emergency calls, but not other long-press emergency calls.

Further, the exemplary embodiment can be configured such that emergency calls cannot be hung up locally (from master speaker 204). Rather, the emergency calls can only be hung up by the peer after being answered. Further, a short-press emergency call could be hung up by master speaker 204 in order to respond to a long-press and thus, place an emergency call. Emergency calls ring until answered, or until a SIP Timer terminates the call after a period of time, such as 3 minutes a non-limiting example, due to it not being answered.

(g) Relays

The master speaker 204 may be equipped with one or more single pole, double throw relays for controlling auxiliary devices. The relays can be controlled by the master controller 202 sending commands to the master speaker 204 and/or in response to the master speaker 204 detecting other activity and controlling the relays directly. For instance, in response to receiving a panic actuation from one master speaker, the master controller 202 can send a command to each of the master controllers, or a subset of the master controllers in the system to trigger one or more relays. In addition, due to other circumstances, such as an alert from authorizes, by action of an operator of the master controller 202, or other activity, the master controller 202 can send commands to trigger one or more relays of one or more master controllers. Further, in response to detecting smoke, excessive heat, actuation of a panic button, etc., the master controller 204 may trigger one or more of its own relays and/or send a signal to the master controller 202 regarding the detected activity.

The relays can be utilized to control various devices, such as door locks, flashing emergency lights (blue lights), releasing fire doors to be closed, changing the time on a clock, engaging window blinds (such as exterior window blinds to prevent glass breakage during high wind or tornado activity, turning on emergency lights, etc. During an emergency, the relays would be used to activate the door locks (forcibly locking the door to prevent entry or exit) and/or activate the flashing emergency lights. In the illustrated embodiment, the relays are shown as controlling door1 208, door2 210 as well as other controllers 214.

The master speaker 204 registers its relays with the master server 202, such as by registering them as GPIOs under an INFORMACAST protocol. The server controller then operates to send commands to the master speaker directed to the registered GPIOs in order to switch the relays. Thus, in some embodiments, only the master controller can operate the relays while in other embodiments, the master controller and/or the master speakers can operate the relays. In addition, in some embodiments the panic button can be used to manually trigger the master speaker to operate the relays, such as using a particular actuation sequence as a non-limiting example.

(h) Wall Plate (Front Panel)

In an exemplary embodiment, the master speaker 204 can be a Wahsega 2×2 ceiling tile IP speaker that is equipped with an analog speaker and internal microphone. In such an embodiment, the master speaker includes an RJ45 connector for receiving a Cat5/6 cable that can be connected to an optional wall plate that serves as the front panel for the master speaker 204. At least three types of wall plates can be interfaced to the master speaker 204: "sound reinforcement only", "mic only", and "sound reinforcement and mic". The "sound reinforcement" wall plates have an audio input jack (e.g. a 3.5 mm miniplug), a button to start/stop sound reinforcement, an LED to indicate when sound reinforcement is enabled and a volume control knob. The "mic" wall plates may include a microphone 206, a button to place or accept a call, and an LED to indicate when the microphone is in use. The illustrated wall plate 230 is shown as including both the audio jack for sound reinforcement 232 and the microphone 206. In some embodiments, the wall plate 230 may also include a local speaker.

When a wall plate with the microphone and call button is installed, the microphone within the wall plate can be used instead of the internal (ceiling) microphone. The "call" button operates as a standard intercom button. Actuating the button while the device is idle (not playing any INFORMACAST broadcasts, although it may be playing multicast streams since those count as "idle") initiates a SIP call to a configurable URI. Unlike the "panic" button, this button doesn't terminate existing calls or broadcasts. Instead it follows the normal rules for accepting new SIP calls based on the configuration of the system. For instance, in one embodiment described above, the actuation will only initiate a SIP call if there are no calls/broadcasts or if there are only SIP calls in progress. Actuation of the "call" button while a SIP call is already in process can be configured to either do nothing or to hang up the call. Further, pressing the button while an incoming SIP call is ringing can be configured to answer the call.

The wall plates that include sound reinforcement include hardware for "sound reinforcement". Sound reinforcement may consist of an audio input jack (e.g. a 3.5 mm miniplug), a button to enable sound reinforcement and/or a volume control knob. To invoke the sound reinforcement, a user connects the audio output of a device (such as a wireless microphone receiver, a smart phone or a DVD player) into the wall plate's audio input jack, and pressing the button to turn on sound reinforcement. When sound reinforcement is on, the audio from the device plugged into the input jack is played over the master speaker, and the sound reinforcement LED is lit. Pressing the button again turns off sound reinforcement. It should be appreciated that sound reinforcement can be activated by the button, as previously described or by detecting that the jack has been inserted.

In some embodiments, sound reinforcement can be set as the lowest priority type of audio. When any other audio, such as INFORMACAST broadcast audio and/or SIP calls is being received in such an embodiment, the sound reinforcement is temporarily disabled so that the audio from the broadcast or SIP call can be heard. When all calls are finished, sound reinforcement resumes as normal (returning to its on/off state from before the call). It should be understood that in some embodiments, the sound reinforcement may receive priority. For instance, in a classroom setting, if the sound reinforcement is being used to administer a test, the user may want to prevent interruptions from the INFORMACAST broadcast audio. Thus, some embodiments may be configured to set the sound reinforcement as high priority, enable a user to selectively adjust the priority, or implement emergency broadcasts that can interrupt the sound reinforcement but prevent other audio broadcasts or SIP calls from interrupting the sound reinforcement. Other configurations are also anticipated for changing and setting the various priorities.

(i) Current Limiting

Typically, if a device is drawing too much current from a PoE, the PoE supply equipment can cut off all power to the port. To prevent this from occurring, the master speaker 204 may include a component for detecting an overcurrent situation. If the master speaker 204 determines that it is drawing too much current, it can then take appropriate measures to limit the current, such as by lowering the volume temporarily, parking an audio broadcast or SIP call, etc.

(j) Status Light and RTFM Button

The master speaker 204 can be equipped with a status light 252 and a RTFM 254 (Reset Test Function Management) button. When the master speaker 204 first boots up, the status light enters into a slow blink state. This state indicates that the master speaker 204 is attempting to obtain an IP address. After the master speaker obtains an IP address, the status light can change to a fast blinking state. The fast blinking state indicates that the master speaker is attempting to register with INFORMACAST server(s) or master server 202. After the master speaker 204 is registered, the status light can be changed to a steady on state. The steady on state can be used to indicate that the master speaker 204 is working normally and can play INFORMACAST broadcasts and receive/place SIP calls.

The RTFM button can be configured for other purposes also. For instance, in some embodiments, the RTFM button can be configured to reformat the file system if it is held down or actuated when power is applied to the master speaker 204 or an on switch is actuated. In addition or alternatively, the RTFM button can be configured to reset only the network configuration to a default setting but maintain other configuration settings if it is actuated for a particular period of time. Further, the RTFM button can be configured to reset all configuration settings to a default state if it is actuated for a different period of time. It should be appreciated that many other settings may also be implemented such as actuating the button a particular number of times over a specified period, etc.

Figure 3:
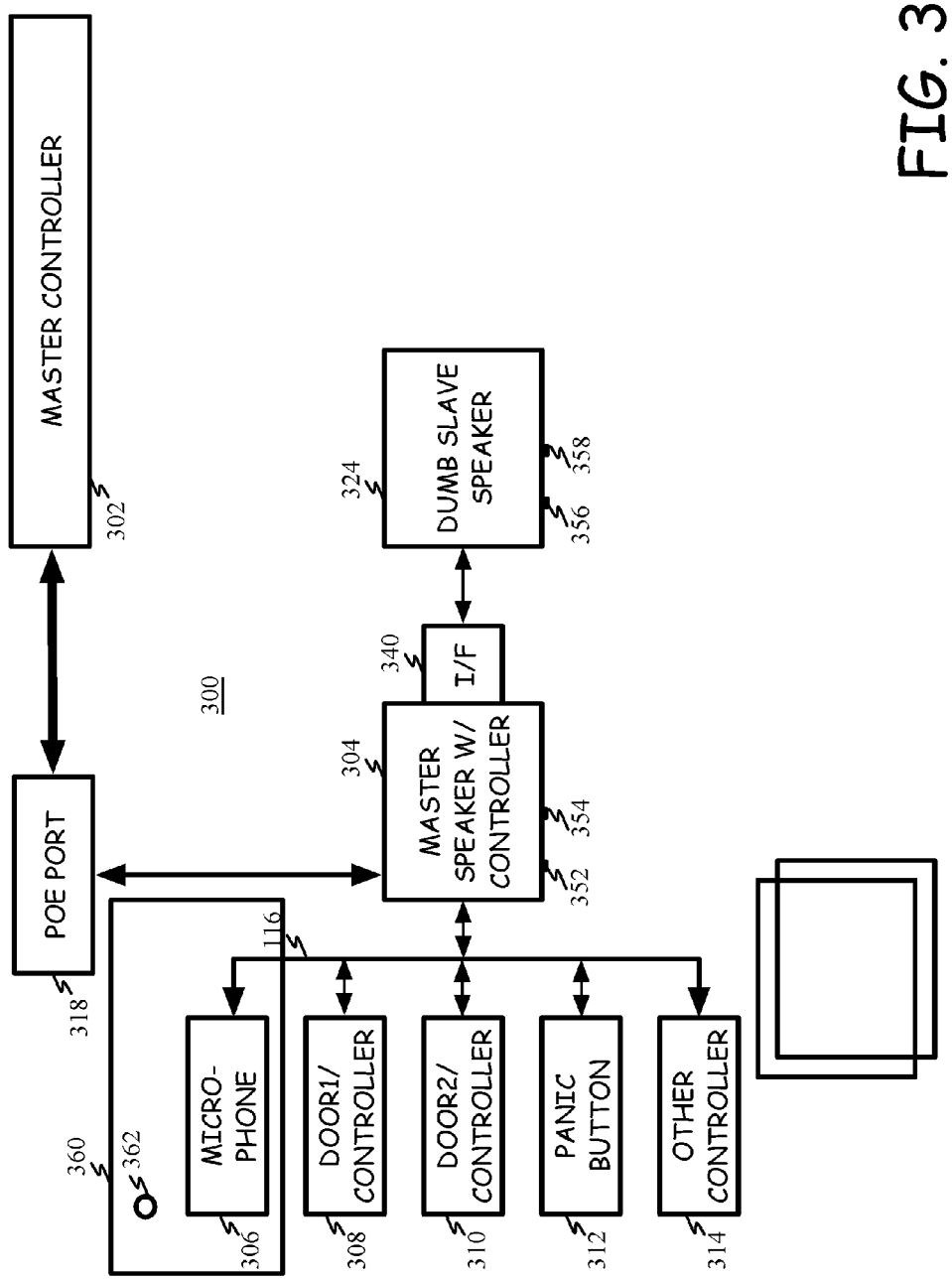
FIG. 3 is a block diagram illustrating the single room deployment of embodiments of the SCS with multiple speakers.

(2) Single Room, Multiple Speakers Playing the Same Audio (a) Single Room with Multiple Analog Speakers FIG. 3 is a block diagram illustrating the single room deployment of embodiments of the SCS with multiple speakers. This single room with multiple speakers deployment includes all of the features described in relationship to the single room single speaker deployment and thus, the afore-described features will not be presented again but rather, will simply be referenced in this section.

In the illustrated configuration, the master controller 302 interfaces to one or more deployed systems 300 thorough a PoE port 318. The illustrated deployed system includes a master speaker 304 and a dumb slave speaker 324. The master speaker 304 interfaces to the dumb slave speaker 324 through an interface/controller 340. The dumb slave speaker 324 includes an internal analog speaker that is driven by the dumb slave speaker 304 but, the dumb slave speaker 324 does not include a microphone. It should be appreciated that although only one dumb slave speaker 324 is illustrated, multiple slave speakers may also be driven by the master speaker 304. Obviously, there is a limitation on the number of slave speakers that can be driven as the Poe 318 is current limited. However, it will be appreciated that other interface ports and improvements on the PoE ports can enable even more slave speaker systems to be driven. Further, it should be appreciated that in some embodiments, the slave speakers may be powered by another system, such as being wired directly to a power source or may include batteries.

The main enhancement in the single room, multiple speaker deployment is that the audio that is sent to the master speaker 304 is also sent to the dumb slave speaker 324 by the interface controller 340.

Another enhancement in the deployed system 300 can be realized in full-duplex operation. The cost associated with implementing the full-duplex operation can be simplified by using the microphone within the master speaker 304. Further, the audio delivered to the room can be sent to the dumb slave speaker 324 while the analog speaker in the master speaker 304 can be muted. Advantageously, this configuration can prevent the feedback that can occur in a full-duplex system simply be having the microphone and the speaker separated.

In the illustrated deployed system 300, the master speaker 304 and the dumb slave speaker 324 may have the same volume controller, different volume controllers or, a volume controller that can be configured to be joined in tandem or operated independently.

The master speaker 304 includes volume controls for the analog speaker (volume/gain) as well as volume/gain for the microphone, noise suppression and a high-pass filter. These features may be common to not only this deployment but also to each of the other embodiments described herein. The dumb slave speaker 324, which only includes an analog speaker, on requires volume control (volume/gain) for the analog speaker.

Separate volume control for each speaker is often desirable to suit various room configurations. For instance, in a sloped lecture hall where the rear ceiling speakers are closer to the audience than the front ceiling speakers, the rear speakers might be set to a lower volume. Conversely, in a lecture hall where the presenter is using a wireless microphone for sound amplification, the front speakers may be quieter to avoid feedback.

(b) SIP Endpoint

Similar to the description in connection with FIG. 2, at startup, the software operating in conjunction with the master speaker 304 reads configuration stored in its non-volatile memory and prepares itself as a SIP endpoint (either by registering with its configured SIP server, or by preparing itself as a peer-to-peer SIP endpoint without registration). No further configuration changes are necessary for the dumb slave speaker 324 during this registration process as the master controller and the system are unaware of the presence of the dumb slave speaker 324.

(c) Multiple Calls

Similar to the deployment presented in FIG. 2 and described herein, the master speaker 304 can be configured to allow multiple simultaneous calls. As such, the functions, components and capabilities presented above equally apply in this deployment.

(d) Dual Registration

Similar to the deployment presented in FIG. 2, embodiments of the master speaker 304 can be "dual registered" as both an INFORMACAST speaker and a SIP endpoint. As such, the functions, components and capabilities presented above equally apply in this deployment. However, in the deployed system 300, an additional capability can be realized in the handling of multiple calls. For instance, in some embodiments of this deployment, if an INFORMACAST audio broadcast and a SIP call occur simultaneously, the audio associated with the different calls can be sent to different speakers and the volume for each can be independently controlled. Advantageously, this embodiment would allow entities in one part of the room to hear the INFORMACAST audio broadcast while entities at another part of the room can hear the SIP call.

(e) Multicast Audio

Similar to the deployment presented in FIG. 2, embodiments of the deployment presented in FIG. 3 may also support the multicast audio features.

(f) Panic Button

Similar to the deployment presented in FIG. 2, embodiments of the deployment presented in FIG. 3 may also support a panic button 312 connected to the master speaker via a direct connect 316, a bus, a wireless technology, etc. As such, the description of the panic button in connection with FIG. 2 is also applicable to this the embodiments of the deployment presented in FIG. 3.

(g) Relays

Similar to the deployment presented in FIG. 2, the master speaker 304 may be equipped with one or more single pole, double throw relays for controlling auxiliary devices. In the illustrated embodiment, the relays are shown as controlling door1 308, door2 310 as well as other controllers 314, but it will be appreciated that any number of relays can be utilized in the various embodiments to control any of a variety of types of devices and the ones presented herein are simply provided as non-limiting examples.

As such, the description presented in connection with FIG. 2 applies as well to the deployment presented in FIG. 3.

(h) Wall Plate (Front Panel)

Similar to the deployment presented in FIG. 2, the embodiments of the deployment in FIG. 3 may include an optional wall plate 360 that serves as the front panel for the master speaker 304 and, also operates to control the dumb slave speaker 324 through the master speaker 304. As such, the features and functionality presented in the description of FIG. 2 also apply to FIG. 3. However, it should be appreciated that in some embodiments, a separate sound reinforcement jack may be provided for the master speaker 304 and the dumb slave speaker 324.

(i) Current Limiting

Similar to the deployment presented in FIG. 2, the embodiments of the deployment of FIG. 3 may include current limiting to prevent the PoE from cutting off all power to the port or the master speaker 304. However, it should be appreciated that the dumb slave speaker 324 may include its own power source by plugging into an outlet or direct wiring, or even include battery power.

(j) Status Light and RTFM Button

In an exemplary embodiment, the dumb slave speaker 324 may include a similar status light 356 and RTFM button 358 as the master speaker 304 (352 and 354 respectively). In some embodiments, the status light may be a different color (i.e. yellow) so the master speaker 304 and the dumb slave speaker 324 can be visually distinguished. In some embodiments the state status light of the dumb slave speaker 324 can mirror the state of the master speaker 304. In other embodiments, the status may be decoupled to independently provide a status indication for each speaker system. Further, in some embodiments the RTFM button 358 on the slave speaker can be disabled, while in other embodiments it may be functionally and/or physically tied to the RTFM button 354 of the master speaker 304. In the these embodiments, the entire system is controlled by the actuation of the RTFM button 354 or either of the RTFM buttons 354 or 358 depending upon the configuration. Further, the RTFM button 354 and the 358 may operate independent of each other and control the speaker system to which they are coupled.

(3) Multiple Rooms/Zones with Each Room/Zone Having a Speaker.

Figure 4:
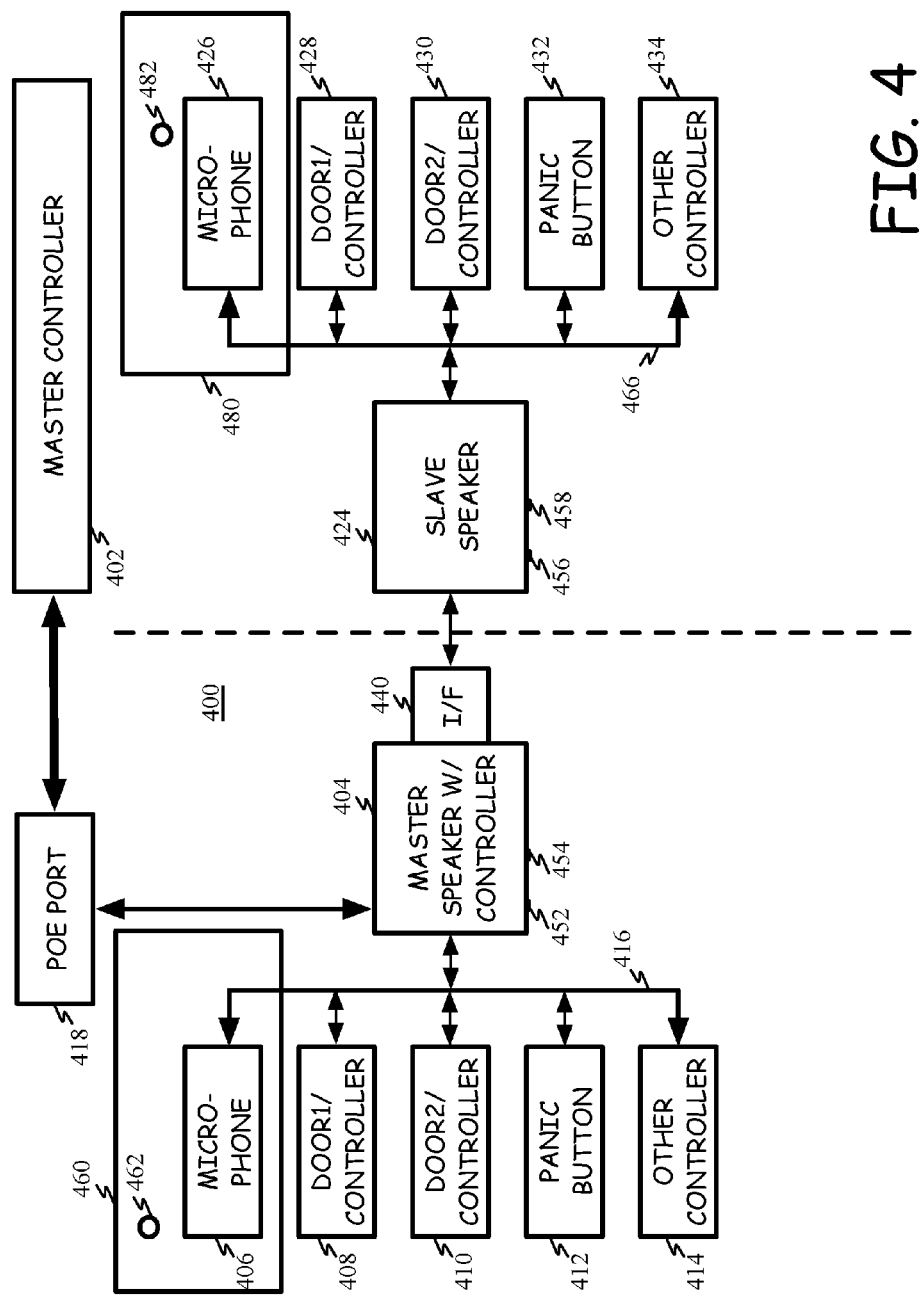
FIG. 4 is a block diagram illustrating the multiple room deployment of embodiments of the SCS.

FIG. 4 is a block diagram illustrating the multiple room deployment of embodiments of the SCS. In current state of the art deployments, in setting up multi-room systems, a deployed system similar to system 200 of FIG. 2 or 300 of FIG. 3 are placed in each room. This can be costly in that a PoE line must be run to each room and a fully equipped master speaker must also be deployed in each room. The various embodiments of the deployment presented in FIG. 4 enable a cost savings over the current state of the art by utilizing a single master speaker 404, connected to a master controller 402 through a Poe port 418 hardware specially designed to control the room in which the master speaker is installed, as well as slave speaker 424 located in one or more other rooms independently. This saves on the overall cost because fewer of the more expensive master speakers are utilized, less PoE supply equipment [PSE] is necessary, fewer cable runs are required and less maintenance is needed by IT support departments.

In the various embodiments of the deployment of FIG. 4, the slave speakers 424 in each room have the same functionality and provide the same user experience as the master speaker 404 but, at a great cost savings.

(a) InformaCast Speaker

The various embodiments that take the form of the deployment presented in FIG. 4 basically operate or behave as though multiple master speakers have been deployed. As a non-limiting example, if the master speaker 404 is based on an INFORMACAST speaker, each of the slave speakers 424 in the system also appear to operate as an INFORMACAST speaker. Utilizing the discovered INFORMACAST configuration, the master speaker 404 registers itself multiple times with the InformaCast server(s), once for the master speaker 404 and once for each slave speaker 424. In exemplary embodiments, the master speaker 404 registers using a different MAC address for each speaker (master and slave). The MAC address for the master speaker 404 corresponds to its Ethernet address, as normal. The MAC address for each slave speaker 424 is an otherwise valid MAC address that is not used for any Ethernet communication. Rather, it is only used so the INFORMACAST servers can distinguish the registrations.

The first INFORMACAST registration (using the master speaker's WAN MAC address, the one it uses for all its Ethernet communication) is for master speaker 404. The subsequent INFORMACAST registrations are for the slave speaker 424.

(b) SIP Endpoint

Similar to the embodiments described in connection with FIG. 2, the embodiments for the deployment presented in FIG. 4 may operate to establish the master speaker 404 as a SIP endpoint as well as to establish other SIP accounts for each of the slave speakers 424.

(c) Multiple Calls

Similar to the description presented in connection with the deployment presented in FIG. 2, various embodiments of the deployment of FIG. 4 may include the ability to handle multiple calls. As such, the features presented in connection with FIG. 2 also apply to the embodiments for FIG. 4. However, in the embodiments presented for FIG. 4, the speaker and microphone associated with the master speaker 404 and the slave speaker 424 operate independently. Thus, a call on the master speaker 404 does not preclude any type of call on any of the slave speaker 424, and vice versa. It will be appreciated that in some embodiments, the audio processing is still performed by the master speaker 404 and as such, the master speaker 404 maintains a combined rough estimate of its CPU usage, and decides to accept or reject additional calls based on that combined estimate.

(d) Dual Registration

Similar to the embodiments presented in connection with FIG. 2, the various embodiments of the deployment illustrated in FIG. 4 may have a master speaker 404 that can be "dual registered" as both an INFORMACAST speaker and a SIP endpoint. In such embodiments, the master speaker 404 maintains active registrations/accounts with both services simultaneously. Similarly to the description presented for FIG. 2, in supporting dual registration, the master speaker 404, as well as each of the slave speakers 424 can receive an incoming call from either the INFORMACAST audio broadcast or the SIP call services. As such, the functions, components and capabilities presented above with regards to FIG. 2 equally apply in this deployment. Also, it will be appreciated that a hybrid deployment can also be utilized. For instance, a deployment may include a master speaker 404 and a slave speaker 424, as illustrated in FIG. 4, as well as a dumb slave speaker, similar to the dumb slave speaker 324 of FIG. 3, that is controlled by the master speaker 404. In such an embodiment, an additional capability can be realized in the handling of multiple calls. For instance, in some embodiments of this deployment, if an INFORMACAST audio broadcast and a SIP call occur simultaneously for either the master speaker 404, the audio associated with the different calls can be sent to different speakers and the volume for each can be independently controlled. Advantageously, this embodiment would allow entities in one part of the room to hear the INFORMACAST audio broadcast while entities at another part of the room can hear the SIP call.

(e) Multicast Audio

Similar to the deployment presented in FIG. 2, embodiments of the deployment presented in FIG. 4 may also support the multicast audio features. However, in the embodiments of FIG. 4, both the master speaker 404 and the slave speaker 424 can support multicast audio.

(f) Panic Button

Similar to the deployment presented in FIG. 2, embodiments of the deployment presented in FIG. 4 may also support a panic button 412 connected to the master speaker 404 via a direct connect 416, a bus, a wireless technology, etc., as well as a panic button 432 connected to the slave speaker 424 via a similar connection 466. As such, the description of the panic button in connection with FIG. 2 is also applicable to the embodiments of the deployment presented in FIG. 4. However, as illustrated in FIG. 4, the slave speaker 424 has its own panic button 432, identical to the panic button 412 that interfaces to the master speaker 404. In an exemplary embodiment, when the panic button 432 is actuated the slave speaker 424 sends a signal to the master speaker 404 to indicate the activity, such as over a UART interface.

The actuation of the panic buttons results in the initiation of a call to location that may be prepared to handle any type of emergency (such as a front office or an actual emergency number [9-1-1]), only one set of emergency numbers is configured. A panic button short press on the panic button 432 of slave speaker 424 will invoke a call to the same URI as a short press on the panic button 412 of the master speaker 404, and likewise for a long press. However, the outgoing call is made from the SIP account for the master speaker 404 or the slave speaker 424 in accordance with which panic button was actuated.

It will be appreciated that the master speaker 404 provides the CPU power for the audio processing of the master speaker 404 audio and audio for each of the slave speakers 424. Thus, in the embodiments for FIG. 4, when an emergency call is initiated for either the slave speaker 424, any current calls that are on the necessary call lines for the slave speaker are hung up (or parked). If there still is not sufficient resources to process the emergency call (i.e. insufficient CPU) then calls on other lines are hung up until there are sufficient resources to place the emergency call.

As a non-limiting example, if the panic button 432 is actuated, the master speaker 404 hangs up any calls/broadcasts that are currently on slave speaker 424 audio line. However, the audio line for the master speaker 404 may also have some calls/broadcasts on its line that are consuming too much CPU, a shared resource. If there are not sufficient resources to accept the emergency call from the slave speaker 424, then the calls/broadcasts on master speaker 404 audio line are also terminated until there are sufficient resources to accept the emergency call from the slave speaker.

(g) Relays

Similar to the deployment presented in FIG. 2, the master speaker 404 and each slave speaker 424 may be equipped with one or more single pole, double throw (SPDT) relays for controlling auxiliary devices. The master speaker 404 operates to register the SPDT relays with the INFORMACAST server as part of the registration process. The INFORMACAST server sends commands to operate the relays, which the master speaker 404 turns into UART commands that it sends to the slave speaker 424 instructing it to take the appropriate action to operate a relay. Thus, signals sent to the master speaker 404 can be used to trigger a relay that interfaces with door1 408, door2 410 and the other controller 414. Likewise, commands can be sent to the slave speaker 424 to trigger the relay that interfaces with door1 428, door2 430 and other controller 434.

(h) Wall Plate (Front Panel)

The wall plate 460 for the master controller operates as described in connection with the wall plate 260 as presented in FIG. 2, including microphone 406 and sound reinforcement jack 462. Further, the slave speaker 424 also may include a wall plate 480 with sound reinforcement jack 482 and microphone 426.

The slave speaker 424 may be connected to an RJ45 jack of the master speaker 404 through Cat5/6 cable, as a non-limiting example, which can provide power, line audio, and UART communicatively. The slave speaker 424 can be connected to its wall plate 480 through another RJ45 and Cat5/6 or other cable, similar to how the master speaker 404 is connected to its respective wall plate 460.

The wall plate 480 for the slave speaker 424 and the wall plate 460 for the master speaker may be identical in functionality, hardware, connections and capabilities. However, the two wall plates may differ in implementation. For instance, the slave speaker 424 may simply send and receive UART commands to and from the master speaker 404. As a non-limiting example, the slave speaker 424 may send a command to inform master speaker 404 of a change in its inputs (e.g. button pressed on the wall plate 480, button released, sound reinforcement switch changed position, etc.). In turn, the master speaker 404 can send commands to instruct the slave speaker 424 to changes its outputs (e.g. changing its audio routing or amplification, setting its LEDs, controlling its relays, etc.).

(i) Current Limiting

Similar to the deployment presented in FIG. 2, the embodiments of the deployment of FIG. 3 may include current limiting to prevent the PoE from cutting off all power to the port or the master speaker 304. However, it should be appreciated that the dumb slave speaker 324 may include its own power source by plugging into an outlet or direct wiring, or even include battery power. In such configurations, the master speaker 404 only is required to monitor the current drain directly associated with what it controls.

(j) Status Light and RTFM Button

In an exemplary embodiment, the slave speaker 424 may include a similar status light 456 and RTFM button 458 as the master speaker 404 (452 and 454 respectively). In some embodiments, the status light may be a different color (i.e. yellow) so the master speaker 404 and the slave speaker 424 can be visually distinguished (for instance, if the two are installed in the same or adjacent room). In some embodiments the state status light of the slave speaker 424 can mirror the state of the master speaker 404. In other embodiments, the status may be decoupled to independently provide a status indication for each speaker system. Further, in some embodiments the RTFM button 458 on the slave speaker can be disabled, while in other embodiments it may be functionally and/or physically tied to the RTFM button 454 of the master speaker 404. In the these embodiments, the entire system is controlled by the actuation of the RTFM button 454 or either of the RTFM buttons 454 or 458 depending upon the configuration. Further, the RTFM button 454 and the 458 may operate independent of each other and control the speaker system to which they are coupled.

The "slow blink" (obtaining IP address) status light mode can be the same for both the master speaker 404 and the slave speaker 424, in embodiments in which the master speaker 404 is the only device that obtains an IP address.

The "fast blink" (registering with INFORMACAST server(s)) status light mode may also have transition at different times for the master speaker 404 and the slave speaker 424, as they have separate INFORMACAST accounts.

Likewise, the "steady illumination" state can be entered separately for the master speaker 404 and each of the slave speakers 424 based on the status of its respective INFORMACAST account. For instance, although unlikely, it's possible that the master speaker 404 INFORMACAST account could register but one or more of the slave speaker 424 INFORMACAST accounts could fail, or vice versa. For example, one may have a device-specific configuration file provided by the server which has incorrect information.

It should be appreciated that the control and functionality of the slave speaker 424 can be completely housed in the master speaker 404 and/or the interface controller 440. However, in some embodiments, some or all of the functionality of the slave speaker 424 can be implemented within the slave speaker 424. While it is anticipated that having all of the functionality and control within the master speaker 404 is the most cost effective solution, it is understood that migration of some of the functionality and control may be negligible from a cost perspective or may be optimal from an operational perspective. Thus, the present disclosure is not limited to simply one configuration.

Figure 5:
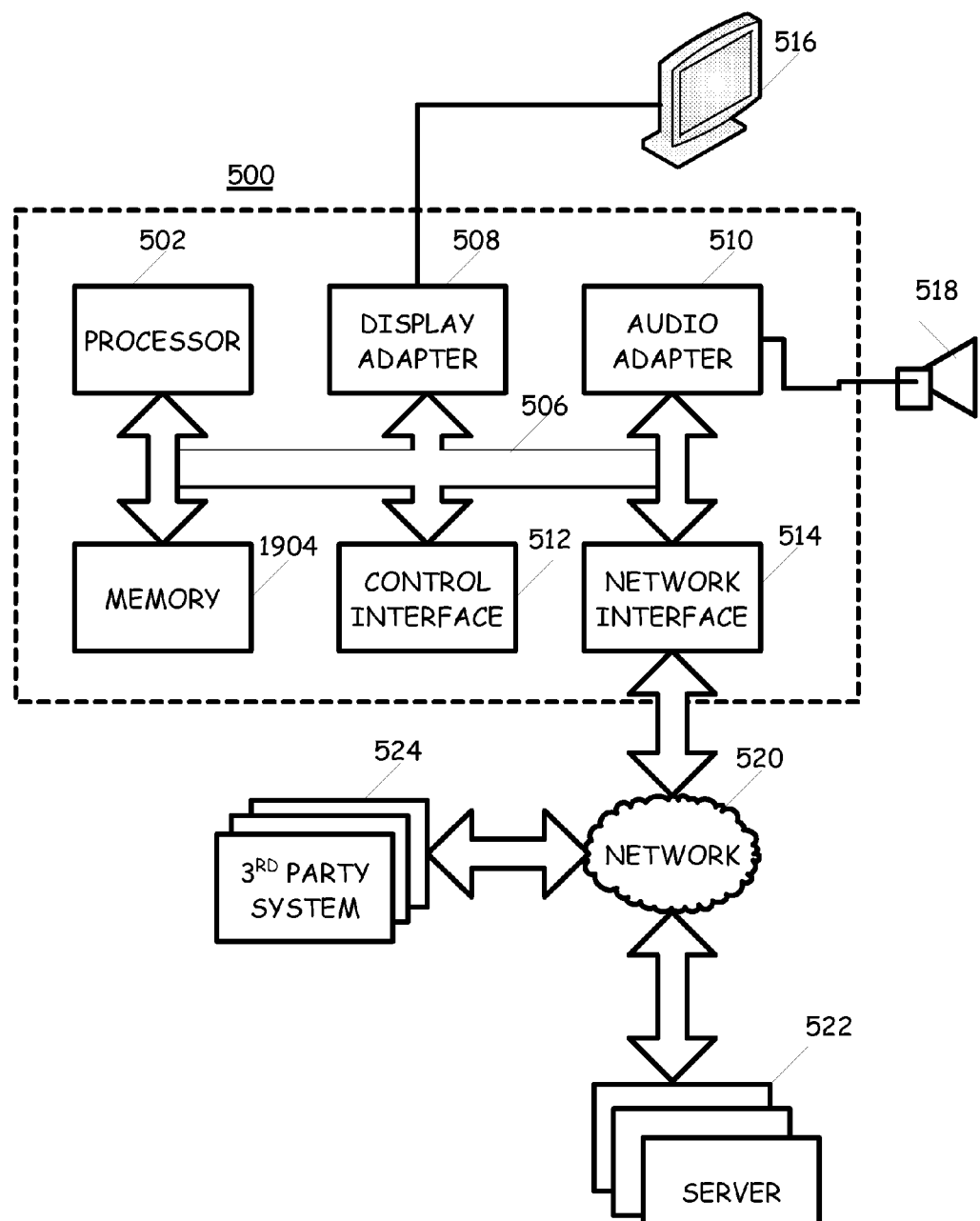
FIG. 5 is a functional block diagram of the components of an exemplary embodiment of system or sub-system operating as a controller or processor 500 that could be used in various embodiments of the disclosure for controlling aspects of the various embodiments.

FIG. 5 is a functional block diagram of the components of an exemplary embodiment of system or sub-system operating as a controller or processor 500 that could be used in various embodiments of the disclosure for controlling aspects of the various embodiments. It will be appreciated that not all of the components illustrated in FIG. 5 are required in all embodiments or implementations of a component but, each of the components are presented and described in conjunction with FIG. 5 to provide a complete and overall understanding of the components. Thus, the processing system illustrated in FIG. 5 could be utilized in implementing the master controller, the master speaker, the interface controller and the slave speaker, as well as other components or devices that they may interface with. The controller can include a general computing platform 500 illustrated as including a processor/memory device 502/504 that may be integrated with each other or, communicatively connected over a bus or similar interface 506. The processor 502 can be a variety of processor types including microprocessors, micro-controllers, programmable arrays, custom IC's etc., and may also include single or multiple processors with or without accelerators or the like. The memory element of 504 may include a variety of structures, including but not limited to RAM, ROM, magnetic media, optical media, bubble memory, FLASH memory, EPROM, EEPROM, etc. The processor 502, or other components in the controller may also provide components such as a real-time clock, analog to digital convertors, digital to analog convertors, etc. The processor 502 is also illustrated as optionally interfacing to a variety of elements including a control interface 512, a display adapter 508, an audio adapter 510, and network/device interface 514. The control interface 512 provides an interface to external controls, such as sensors, actuators, SPDT relays, the PSTN, a cellular network, pressure actuators, step motors, a keyboard, a mouse, a pin pad, an audio activated device, as well as a variety of the many other available input and output devices or, another computer or processing device or the like. The display adapter 508 can be used to drive a variety of alert elements 516, such as display devices including an LED display, LCD display, one or more LEDs or other display devices. The audio adapter 510 may interface to and drive another alert element 518, such as a speaker or speaker system, buzzer, bell, etc. The optional network/interface 514 may interface to a network 520 which may be any type of network including, but not limited to the Internet, a global network, a wide area network, a local area network, a wired network, a wireless network or any other network type including hybrids. Through the network 520, or even directly, the controller 500 can interface to other devices or computing platforms such as one or more servers 522 and/or third party systems 524. A battery or power source provides power for the controller 500.

FIG. 6A-FIG. 6K presents a flow diagram to illustrate exemplary steps in a process for establishing and operating an embodiment of a multiple rooms/zones with each room/zone having a speaker as presented in the deployment of FIG. 4. Initially the system is installed by an installer, such as an electrician and each of the components are connected. It should be appreciated that additional components can be added after initial installation but the following processes would be similar. Once power is applied to the system 601, the master speakers go through a registration process 602. This process establishes an IP address for the master speakers and notifies the master controller of the configuration of the master speakers (i.e., what components, capabilities and controls are installed). The slave speakers are also registered. The slave controller boards interface with the slave speakers to identify the configuration and then notifies the master controller.

Once the system is registered, it is read to receive and respond to various events as outlined above. If an event is received 603, processing continues to a series of decision blocks to determine what type of event was received. It should be appreciated that this can be determined in a single step, such as analyzing the scope in an INFORMACAST based system.

Figure 6A:
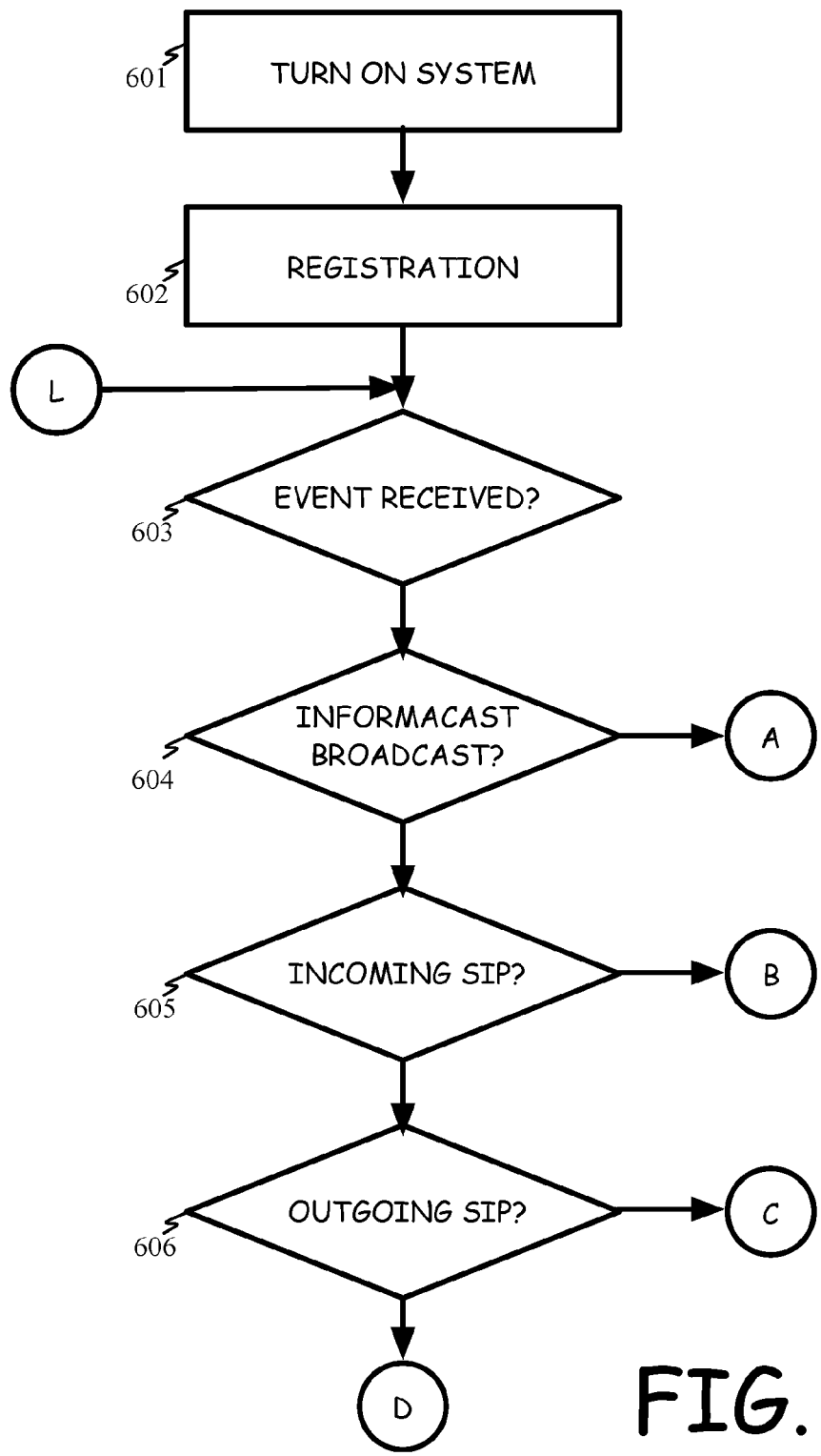
FIG. 6A-FIG. 6K present flow diagrams to illustrate exemplary steps in a process for establishing and operating an embodiment of a multiple rooms/zones with each room/zone having a speaker as presented in the deployment of FIG. 4.
Figure 6B:
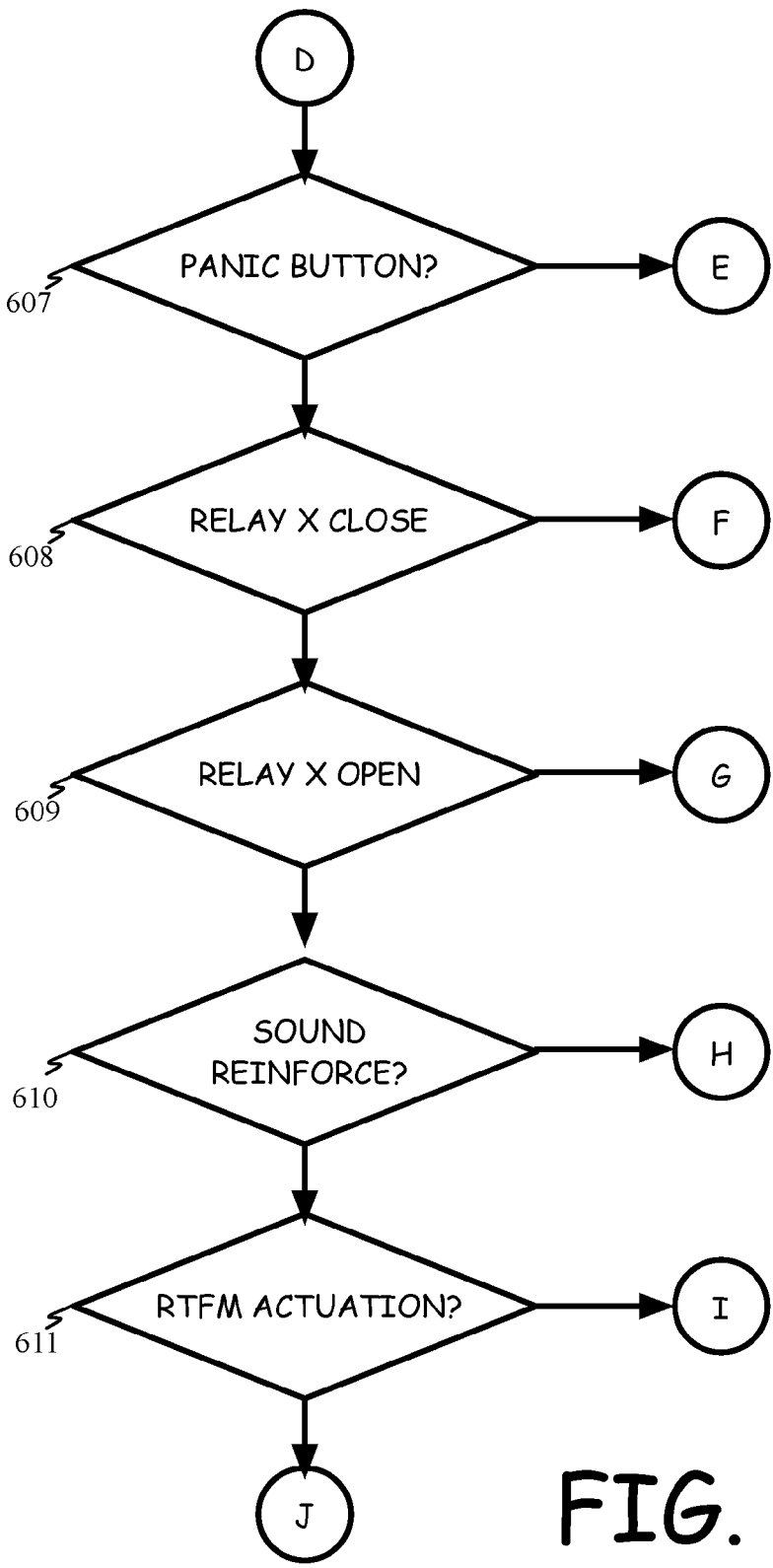
Figure 6C:
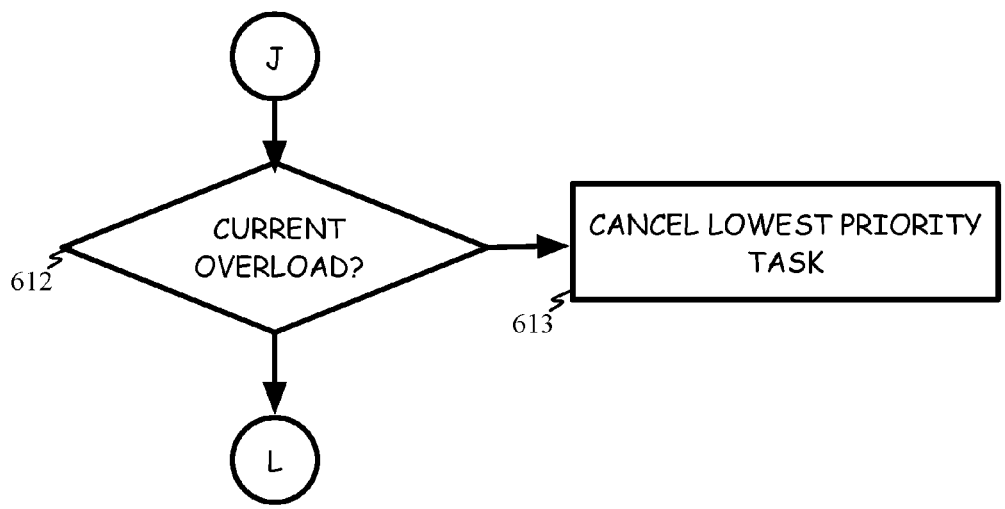
Figure 6D:
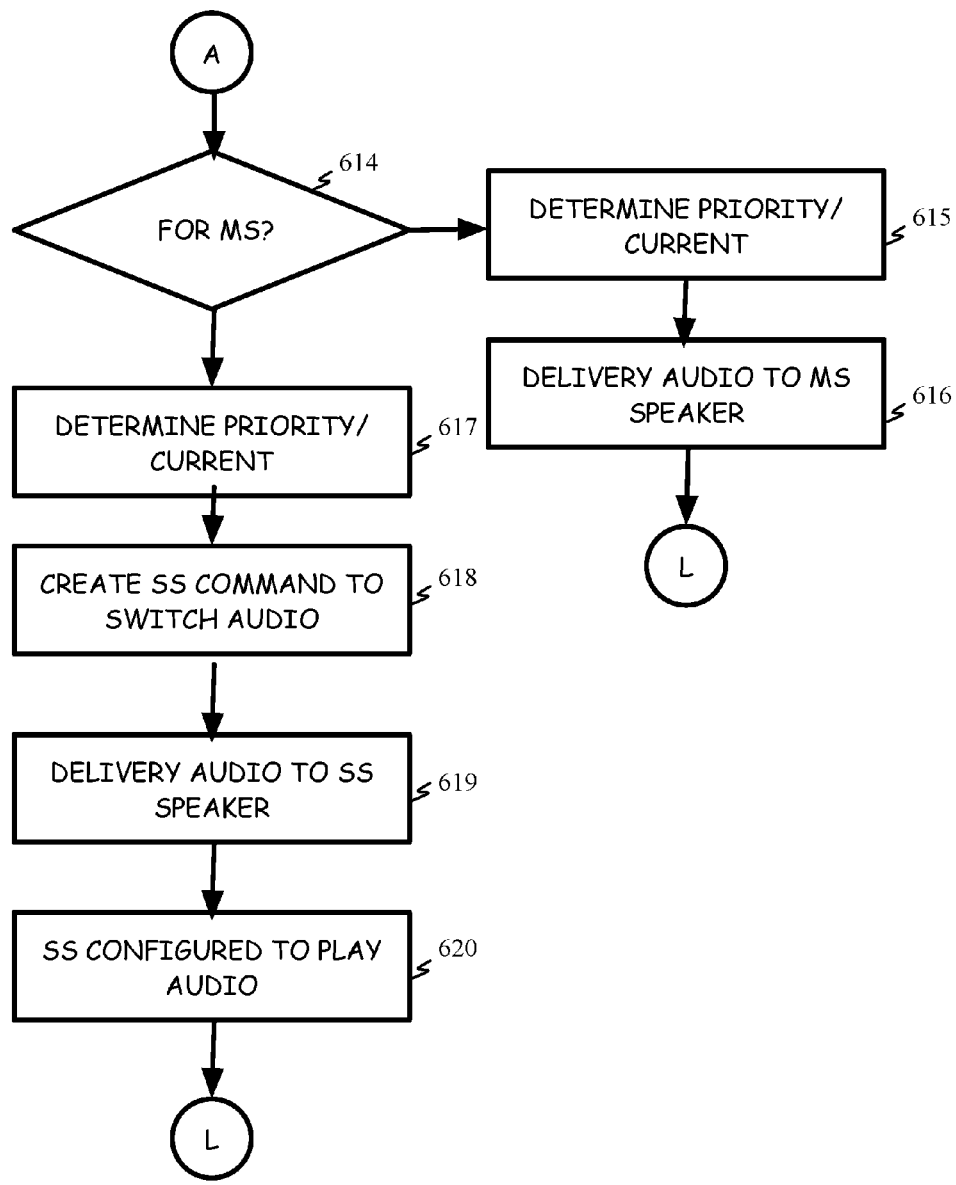

If the event is a broadcast event 604, processing continues at point A in FIG. 6D. The broadcast event may be intended for the master speaker or a slave speaker 614. If the broadcast event is for the master speaker, the master speaker determines the priority of the broadcast event in view of any other broadcast events or SIP calls that may be currently active. In addition, the master speaker analyzes the current drawn from the PoE to determine if an additional broadcast can be added to the system 615. Thus, the master speaker may park or cancel one or more current broadcasts and then deliver the audio for the new broadcast to the speaker 616 or, the master speaker may cancel or park the newly requested broadcast. Processing then continues at point L of FIG. 6A.

If the broadcast event is directed to a slave speaker, the controller board receives the event and determines the priority of the broadcast event in view of any other broadcast events and/or SIP calls that may be currently active in the slave speaker 617. In addition, the controller analyzes the current drawn from the PoE by both the master speaker and slave speaker to determine if an additional broadcast can be added to the system 618. Thus, the controller may park or cancel one or more current broadcasts and then deliver the audio for the new broadcast to the slave speaker 619 and the controller configures the slave speaker to play the audio 620 or, the controller may cancel or park the newly requested broadcast. Processing then continues at point L of FIG. 6A.

Figure 6E:
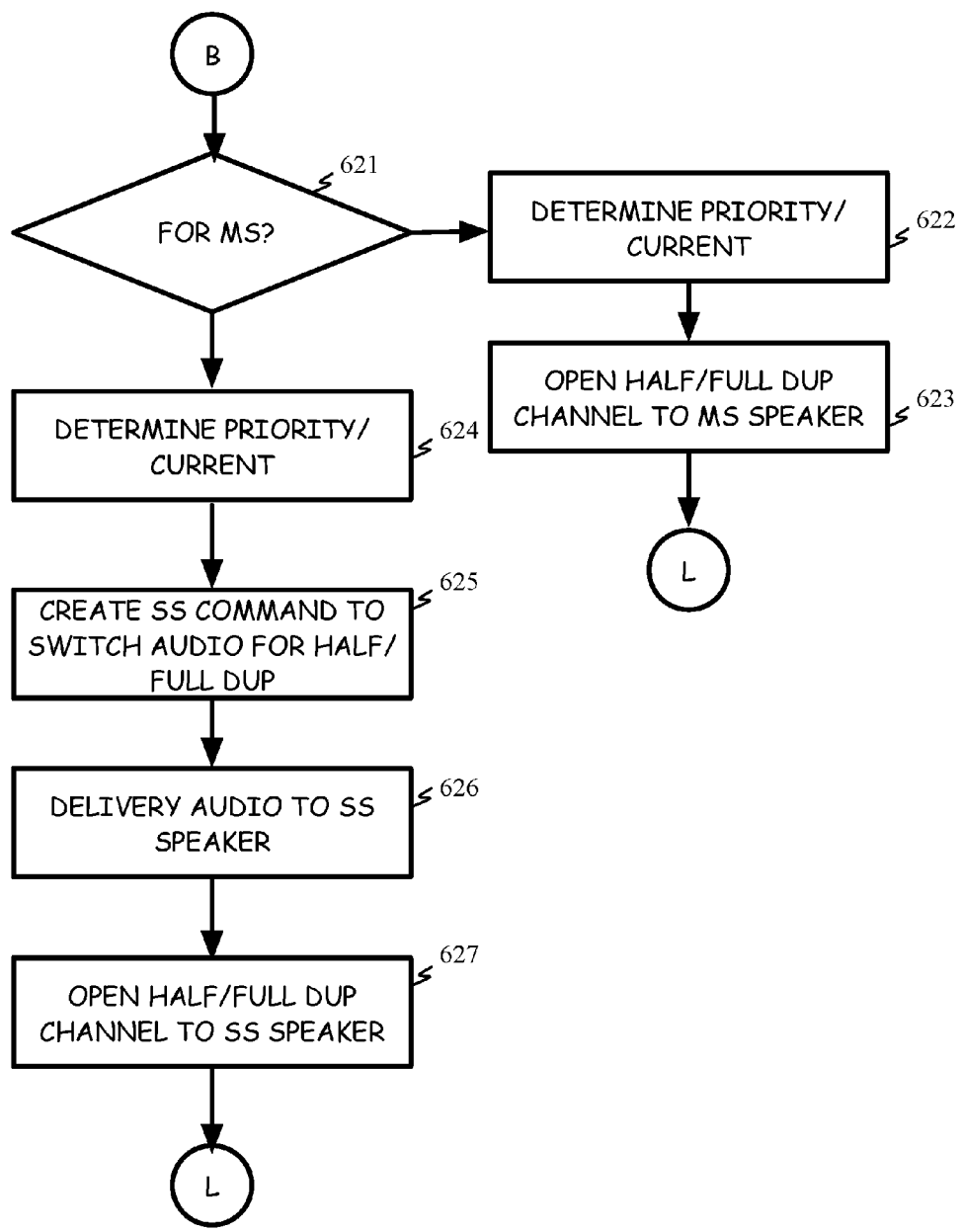
Figure 6F:
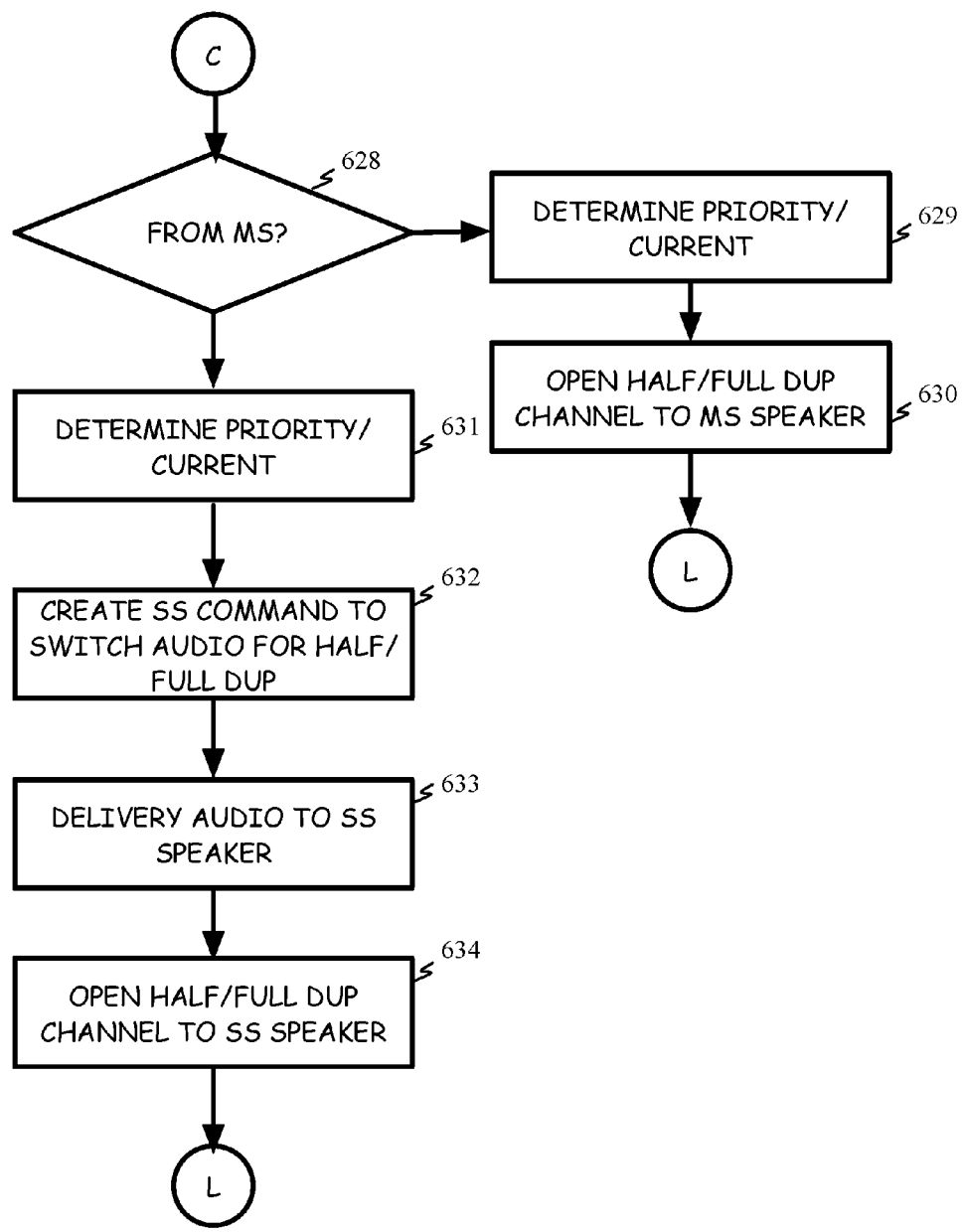
Figure 6G:
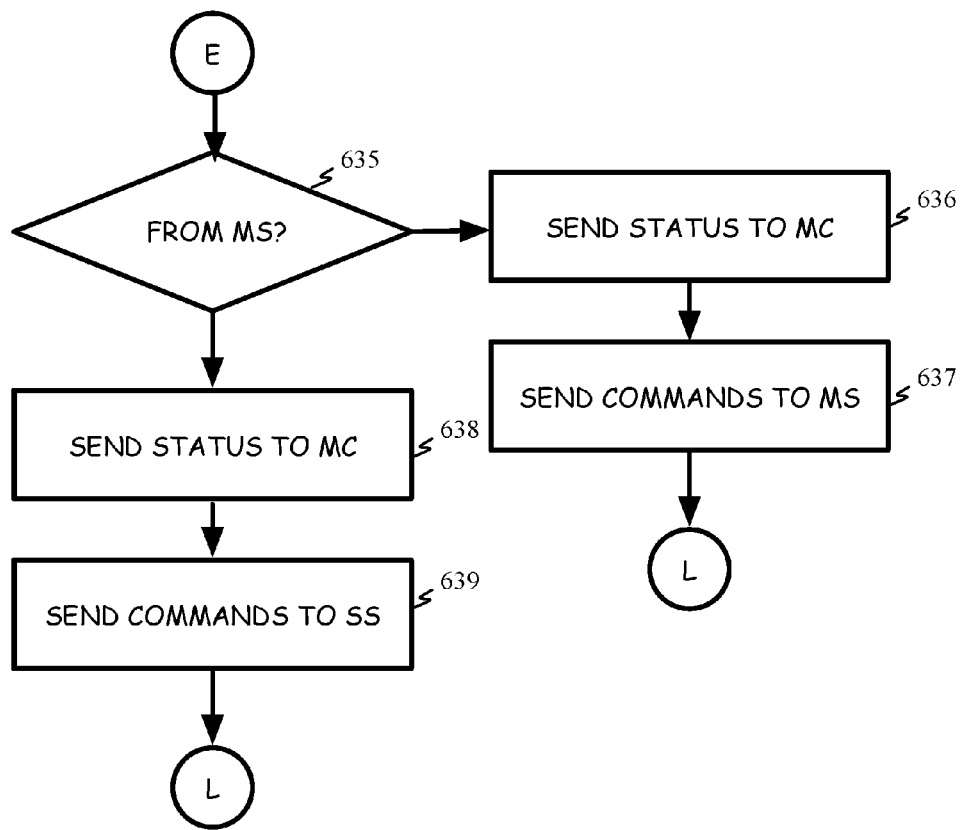

Returning to FIG. 6A, if the event is an incoming SIP call 604, one that is being sent from the master controller, the processing continues at point B in FIG. 6E. The SIP call may be intended for the master speaker or a slave speaker 621. If the SIP call event is for the master speaker, the master speaker determines the priority of the SIP event in view of any other broadcast and/or SIP calls that may be currently active 622. In addition, the master speaker analyzes the current drawn from the PoE to determine if an additional broadcast can be added to the system 622. Thus, the master speaker may park or cancel one or more current broadcasts and/or SIP calls, and then sets up the master speaker in either full or half duplex mode and delivers the audio for the new SIP call to the speaker 623 or, the master speaker may cancel or park the newly requested SIP call. Processing then continues at point L of FIG. 6A.

If the SIP event is directed to a slave speaker, the controller board receives the event and determines the priority of the SIP event in view of any other broadcast events and SIP calls that may be currently active in the slave speaker 624. In addition, the controller analyzes the current drawn from the PoE by both the master speaker and slave speaker to determine if the SIP call can be added to the system 625. Thus, the controller may park or cancel one or more current broadcasts and SIP calls, and then deliver the audio for the new SIP to the slave speaker 626 and the controller configures the slave speaker to play the audio 627 in either a full or half duplex mode or, the controller may cancel or park the newly requested broadcast. Processing then continues at point L of FIG. 6A.

Returning again to FIG. 6A, if it is determined that the event is an outgoing SIP call, which is a SIP call initiation originating from either the wall panel connected to the master speaker or the wall panel connected to a slave speaker. Processing then continues at point C in FIG. 6F. If the SIP call originates from the master speaker wall panel, then the master speaker determines the priority of the SIP call in view of currently active broadcasts and/or SIP calls 629 as well as conducting a current draw analysis. If the call can be supported, the master speaker sets up the call in either full or half duplex operation 630. Processing then continues at point L of FIG. 6A.

If the SIP call originates from a slave speaker, the slave speaker sends a command to the controller board and the controller board determines the priority of the SIP call in view of currently active broadcasts and/or SIP calls 631 as well as conducting a current draw analysis. If the call can be supported, the controller board creates a command to be sent to the slave speaker 632. The command basically instructs the slave speaker to be configured to receive the call in either full or half duplex mode. Once the slave speaker is set up, the audio is delivered to the slave speaker 633 and the slave speaker then operates in full or half duplex mode 624. Processing then continues at point L of FIG. 6A.

Returning again to FIG. 6A, processing continues at point D in FIG. 6B. If the event is an actuation of a panic button 607, processing continues at point E of FIG. 6G. The panic button may be one connected to the master speaker or a slave speaker. If the panic button is connected to the master speaker, the master speaker determines what type of an actuation occurred (i.e., the system may be configured to distinguish between long and short actuations as well as multiple actuations). A status is then sent to the master controller 636. In response, the master controller sends one or more commands to the master speaker, as well as potentially other master and slave speakers in the system in response to the particular type of panic actuation that occurred 637. For instance, in one embodiment the master controller may send a relay close command to all master and slave speakers in the system to cause the doors in a classroom to be locked. Processing then continues at point L of FIG. 6A.

If the panic button is connected to a slave speaker, the controller board receives a signal from the slave speaker regarding the type of actuation that has occurred and the controller sends a status to the master controller 638. In response, the master controller sends one or more commands to the master speaker, as well as potentially other master and slave speakers in the system in response to the particular type of panic actuation that occurred 639. For instance, in one embodiment the master controller may send a relay close command to all master and slave speakers in the system to cause the doors in a classroom to be locked. Processing then continues at point L of FIG. 6A.

Figure 6H:
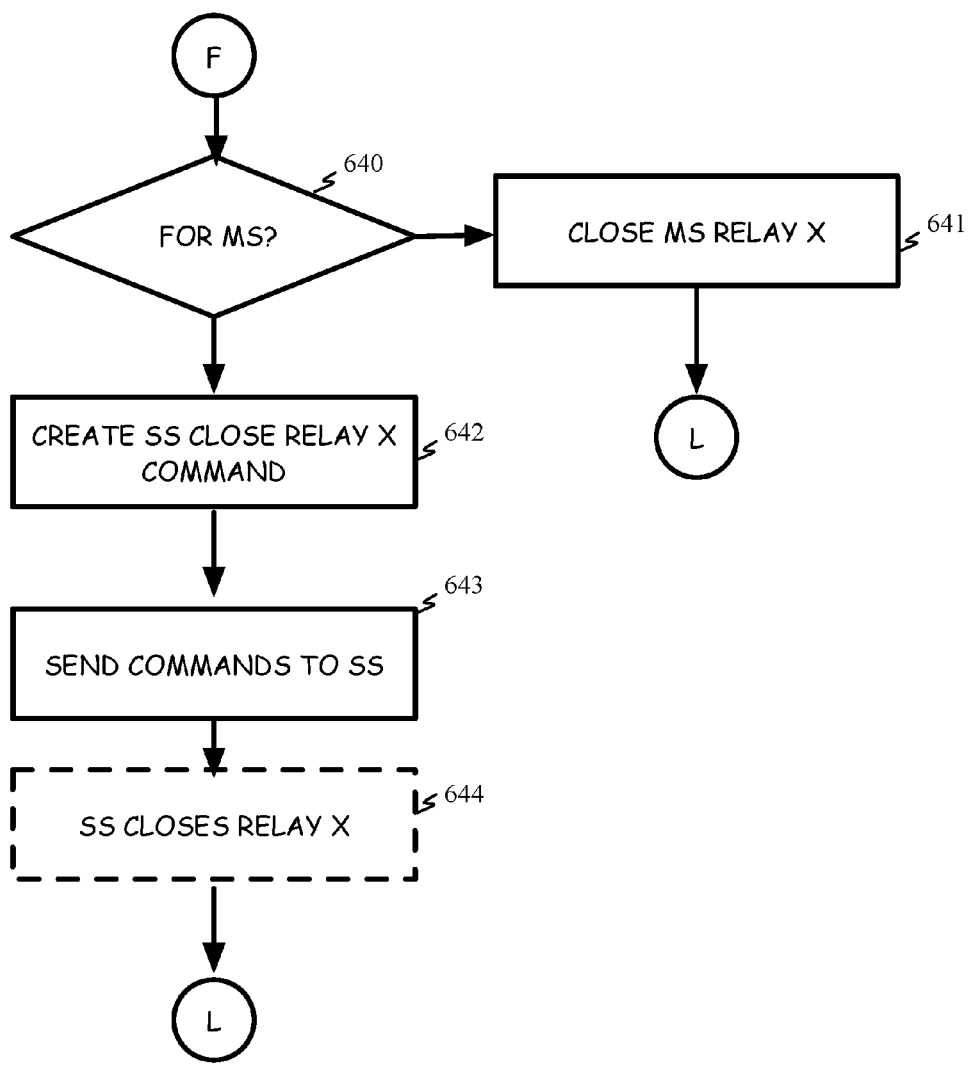

Returning again to FIG. 6B, if the event is a close relay X event 608, processing continues at point F of FIG. 6H. If the command is addressed to the master speaker 640, the master speaker determines which of the relays the command is associated with and then operates to close the appropriate relay 641. A status signal may then be sent to the master controller to confirm such action. Processing then continues at point L of FIG. 6A.

If the command is addressed to a slave speaker, the controller board then creates a command to be sent to the slave speaker 642. The command will include the identification of which relay is to be closed. The command is then sent to the slave speaker 643 and the slave speaker operates to close the appropriate relay 644. A status signal may be sent to the controller board to confirm such action. Processing then continues at point L of FIG. 6A.

Figure 6I:
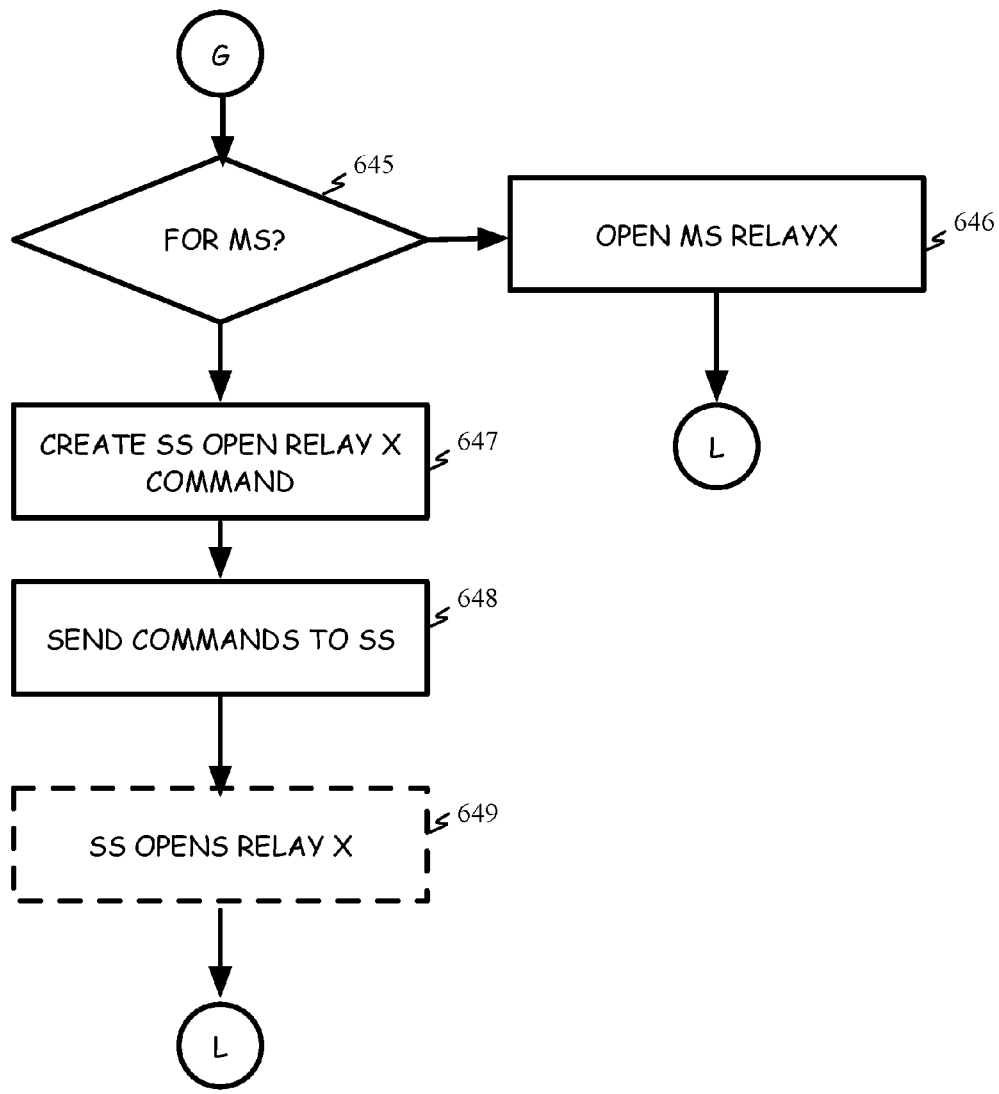

Returning again to FIG. 6B, if the event is an open relay X event 609, processing continues at point G of FIG. 6I. If the command is addressed to the master speaker 645, the master speaker determines which of the relays the command is associated with and then operates to open the appropriate relay 646. A status signal may then be sent to the master controller to confirm such action. Processing then continues at point L of FIG. 6A.

If the command is addressed to a slave speaker 645, the controller board then creates a command to be sent to the slave speaker 647. The command will include the identification of which relay is to be open. The command is then sent to the slave speaker 648 and the slave speaker operates to open the appropriate relay 649. A status signal may be sent to the controller board to confirm such action. Processing then continues at point L of FIG. 6A.

Figure 6J:
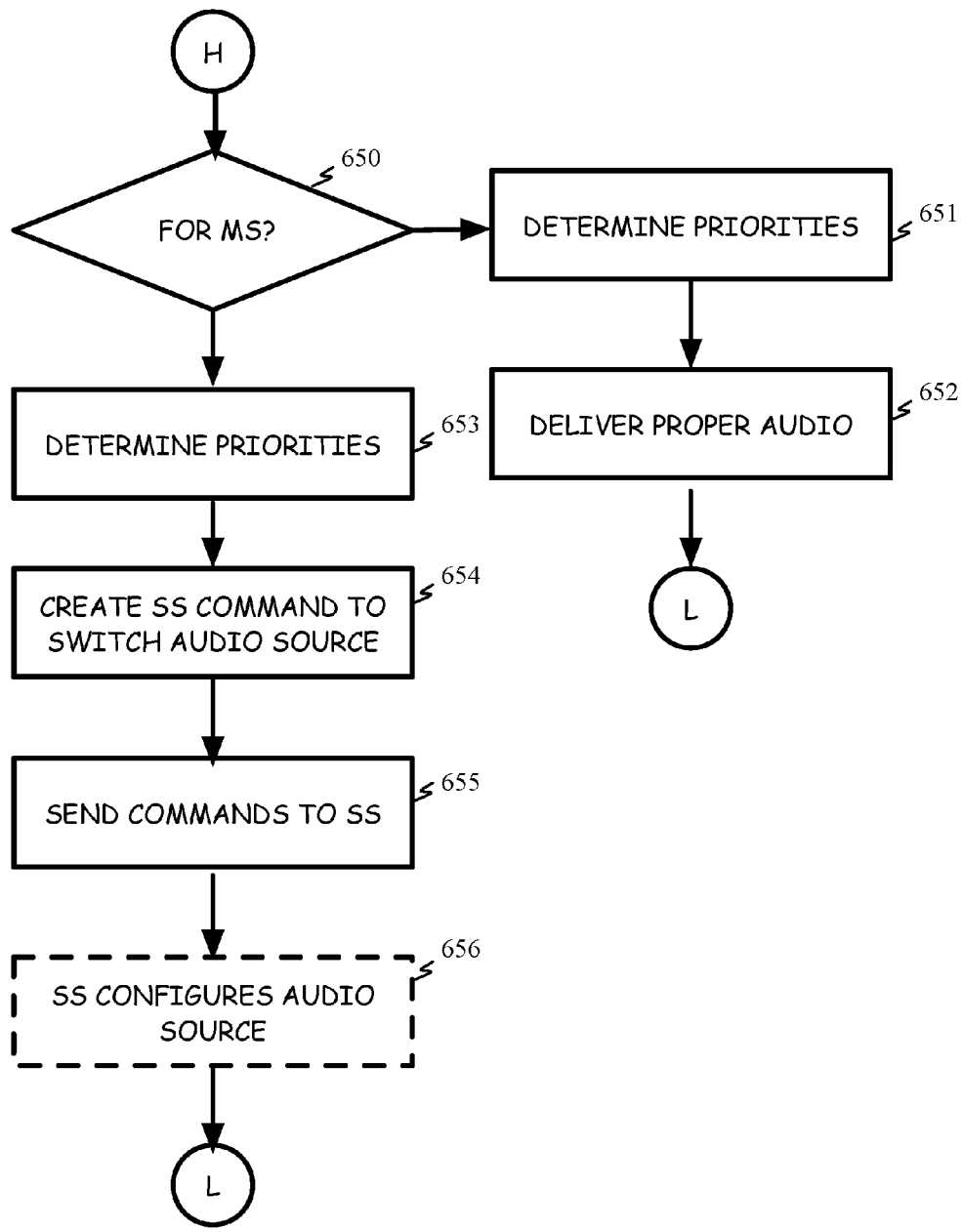

Returning to FIG. 6B, if the event is a sound reinforcement event 610, processing continues at point H of FIG. 6J. If the sound reinforcement event is triggered by inserting a jack and/or actuating a switch on the wall panel connected to the master speaker 650, the master speaker determines the priority of the event in view of currently active broadcasts and/or SIP calls 651 and then configures the master speaker accordingly and, if allowed delivers the audio to the speaker of the master speaker 652. Processing then continues at point L of FIG. 6A.

If the sound reinforcement event is triggered by inserting a jack and/or actuating a switch on the wall panel connected to the master speaker 650, the controller determines the priority of the event in view of currently active broadcasts and/or SIP calls 653. If the sound reinforcement is allowable given the current state of priorities and current draw, the controller creates a command to be sent to the slave speaker to configure it for delivery of the audio source 654. The command is then sent to the slave speaker 655 and the slave speaker is configured to present the audio source 656. Processing then continues at point L of FIG. 6A.

Figure 6K:
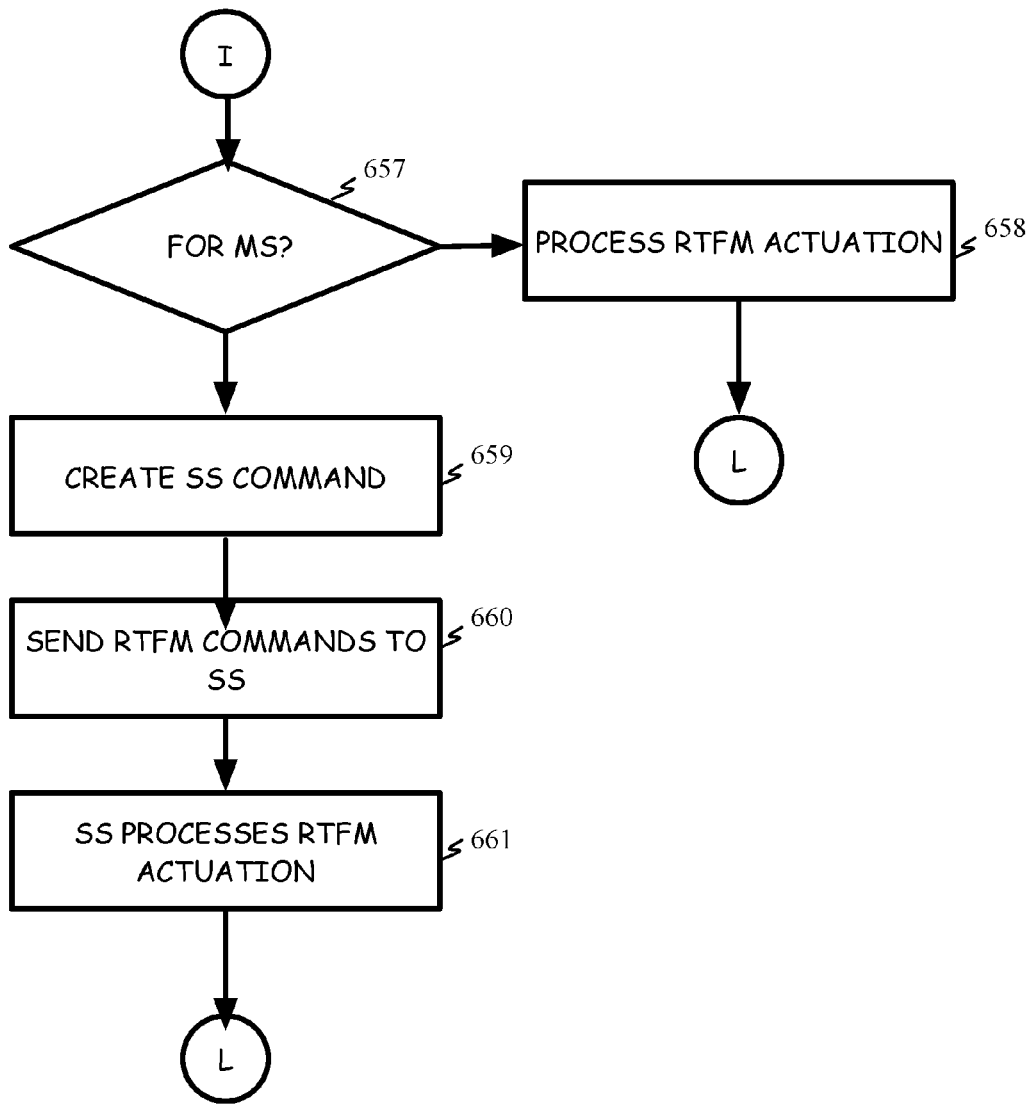

Returning to FIG. 6B, if it is determined that the event is an actuation of the RTFM switch 611, then processing continues at point I in FIG. 6K. If the RTFM actuation is associated with the master speaker 657, then the master speaker can determine what type of actuation occurred and process the event accordingly 658. Processing then continues at point L of FIG. 6A.

If it is determined that the actuation of the RTFM switch is associated with the slave speaker 657 (assuming that the configuration allows the slave speaker RTFM to be active), a signal is sent to the controller board which then analyzed the type of actuation and creates an appropriate command to be sent to the slave speaker. It should be appreciated that actuation of the master speaker RTFM may result in sending a command to the slave speaker and vice versa. Processing then continues at point L of FIG. 6A.

Returning again to FIG. 6B, processing then continues at point J of FIG. 6C. If it is determined that the event is a current overload 612 (i.e., the current drawn by the master speaker and any attached slave speakers exceeds a particular threshold, then the master speaker, in conjunction with the controller board may cancel or park lower priority tasks or event processing to ensure that the current drain is below the threshold value. Processing then continues at point L of FIG. 6A.

It should be appreciated that other events may also be employed in the various embodiments of the SCS and the illustrated events are presented as a non-limiting example.

In this application, it should be appreciated that the various components can consist of hardware, software or a combination thereof. Anything that is described as performing a function, operation or providing control may be a stand-alone unit or a specialized module consisting of any combination of hardware and/or software.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A system for extending functionality of a single room intercom/control system to another room, the system comprising:
   a control module communicatively coupled to a master speaker system;
   a slave speaker system interface communicatively coupled to the control module;
   a slave speaker system comprising:
      an interface to the slave speaker system interface;
      an analog speaker;
      a microphone; and
      one or more control interfaces;
   wherein the master speaker system is coupled to a master controller through a single PoE port and, wherein the control module is configured to:
   register the slave speaker system with the master controller;
   obtain commands received at the master speaker system intended for the slave speaker system; and
   control the operation of the slave speaker control system in accordance with the received commands through the slave speaker interface; and
   the slave speaker interface is configured to provide power from the single PoE port to the slave speaker system.

2. The system of claim 1, wherein upon the control module receiving an audio signal directed to the slave speaker system, the control module transmits the audio signal to the analog speaker of the slave speaker system through the slave speaker system interface.

3. The system of claim 1, wherein upon the control module receiving a control signal directed to a component coupled to on of the slave speaker control interfaces, the control module transmits a signal to the slave speaker to actuate the control interface.

4. The system of claim 1, wherein the slave speaker system interfaces to a panic button through one of the one or more control interfaces and in response to receiving a signal indicating that the panic button has been actuated, the slave speaker system sends a signal to the control module through the slave speaker system interface indicating that the panic button has been actuated.

5. The system of claim 1, wherein the slave speaker system interfaces to a wall plate through one of the one or more control interfaces and, wherein the wall plate includes a microphone and an actuation button, and in response to an actuation of the actuation button, a signal is sent to the slave speaker system and, the slave speaker system sends a signal to the control module through the slave speaker interface to initiate a call.

6. The system of claim 5, wherein the communications between the master controller and the master speaker system conforms to the INFORMACAST protocol.

7. The system of claim 6, wherein the call initiation is a SIP call.

8. The system of claim 1, wherein the communications between the master controller and the master speaker system conforms to the INFORMACAST protocol.

9. The system of claim 1, wherein the communication between the slave speaker interface and the master controller conforms to the INFORMACAST protocol.

10. The system of claim 9, wherein the slave speaker interface can register the slave speaker for INFORMACAST broadcasts and as a SIP endpoint.

11. The system of claim 1, wherein the master controller is configured to monitor the amount of current drawn from the PoE and to limit the operation of the master speaker system and the slave speaker system to prevent the current draw from exceeding a threshold level.

12. The system of claim 1, wherein the slave speaker system includes one or more single pole double throw (SPDT) relays and, the action of the control module obtaining commands received at the master speaker system intended for the slave speaker system comprises obtaining a command to actuate one of the SPDT relays; and the action of the control module controlling the operation of the slave speaker control system in accordance with the received commands through the slave speaker interface comprises creating a command to actuation the SPDT relay and sending it to the slave speaker through the slave speaker interface.

13. The system of claim 12, wherein the commands received from the master controller conform to the INFORMACAST protocol.

14. The system of claim 13, wherein the command created by the control module conforms to a proprietary protocol.

15. The system of claim 1, wherein the slave speaker system interfaces to a wall plate through one of the one or more control interfaces and, wherein the wall plate includes a jack for receiving an audio source, and in response to activating sound reinforcement, a signal is sent to the slave speaker system and, the slave speaker system sends a signal to the control module through the slave speaker interface to provide notice of the event.

16. The system of claim 15, wherein the control module determines that the audio source can be delivered to the slave speaker system and creates a command to configure the slave speaker system to play the audio and sends the command to the slave speaker system through the slave speaker interface.

17. The system of claim 15, wherein the control module determines that the audio source cannot be delivered to the slave speaker system because a higher priority broadcast is currently active.

18. The system of claim 15, wherein the control module determines that the audio source can be delivered to the slave speaker system and creates a command to configure the slave speaker system to play the audio and cancels any currently played audio sources then sends the command to the slave speaker system through the slave speaker interface.

19. The system of claim 1, wherein the master controller is configured to monitor a processing load and to limit the operation of the master speaker system and the slave speaker system if the processing load is above a threshold level.

20. The system of claim 1, wherein the slave speaker system interfaces to a wall plate through one of the one or more control interfaces and, wherein the wall plate includes an audio input jack and an actuation button, and in response to plugging an audio source into the audio input jack and an actuation of the actuation button, the slave speaker system sends a signal to the control module through the slave speaker interface to initiate the control module sending a configuration command to the slave speaker system to enable an audio signal from the audio source to be rendered by the slave speaker system.

* * * * *